US011039306B2

(12) United States Patent
Li et al.

(10) Patent No.: US 11,039,306 B2
(45) Date of Patent: Jun. 15, 2021

(54) AUTHENTICATION OF RANGING DEVICE

(71) Applicant: Intel IP Corporation, Santa Clara, CA (US)

(72) Inventors: Qinghua Li, San Ramon, CA (US); Feng Jiang, Santa Clara, CA (US); Chen Xiaogang, Portland, OR (US); Jonathan Segev, Sunnyvale, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 205 days.

(21) Appl. No.: 16/202,559

(22) Filed: Nov. 28, 2018

(65) Prior Publication Data
US 2019/0098493 A1 Mar. 28, 2019

Related U.S. Application Data

(60) Provisional application No. 62/597,302, filed on Dec. 11, 2017, provisional application No. 62/591,621, filed on Nov. 28, 2017.

(51) Int. Cl.
*H04L 29/06* (2006.01)
*H04W 12/00* (2021.01)
*H04W 12/069* (2021.01)

(52) U.S. Cl.
CPC ......... *H04W 12/009* (2019.01); *H04L 63/068* (2013.01); *H04W 12/069* (2021.01)

(58) Field of Classification Search
CPC ............ H04W 12/009; H04W 12/0609; H04L 63/068
See application file for complete search history.

(56) References Cited

U.S. PATENT DOCUMENTS

| 6,208,961 | B1 * | 3/2001 | Lehtimaki | G10L 19/005 |
| | | | | 455/436 |
| 10,219,271 | B1 * | 2/2019 | Hedayat | H04L 5/0055 |
| 2012/0137191 | A1 * | 5/2012 | Maeda | G10L 19/0212 |
| | | | | 714/752 |
| 2016/0127422 | A1 * | 5/2016 | Basavarajappa | H04W 76/11 |
| | | | | 455/426.1 |
| 2018/0249437 | A1 * | 8/2018 | Lindskog | H04W 64/00 |
| 2019/0349397 | A1 * | 11/2019 | Li | H04W 12/00512 |

* cited by examiner

*Primary Examiner* — Anthony D Brown
*Assistant Examiner* — Rodman Alexander Mahmoud
(74) *Attorney, Agent, or Firm* — Schwegman Lundberg & Woessner, P.A.

(57) ABSTRACT

Methods, apparatuses, and computer readable media for location measurement reporting in a wireless network are disclosed. An apparatus of an initiator station (ISTA), where the apparatus comprises processing circuitry configured to decode a null data packet (NDP) announce (NDPA) frame from an initiator station (ISTA), the NDPA frame comprising a dialog token and an identification of a temporary key. The processing circuitry may be further configured to decode a first NDP from the ISTA, the NDP comprising first long training fields (LTFs), and wherein the NDP is received on a channel and encode a second NDP, the second NDP comprising second LTFs, wherein the second LTFs are determined based at least on the temporary key. The processing circuitry may be further configured to encode a location measurement report (LMR), the LMR comprising the dialog token and an indication of the temporary key.

20 Claims, 21 Drawing Sheets

BSS

AUTHENTICATION OF RANGING DEVICE

PRIORITY CLAIM

This application claims the benefit of priority under 35 USC 119(e) to U.S. Provisional Patent Application Ser. No. 62/591,621, filed Nov. 28, 2017, and U.S. Provisional Patent Application Ser. No. 62/597,302, filed Dec. 11, 2017, both of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11az, IEEE 802.11ax, and/or IEEE 802.11 extremely high-throughput (EHT). Some embodiments relate to encryption and decryption of null data packets (NDPs).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
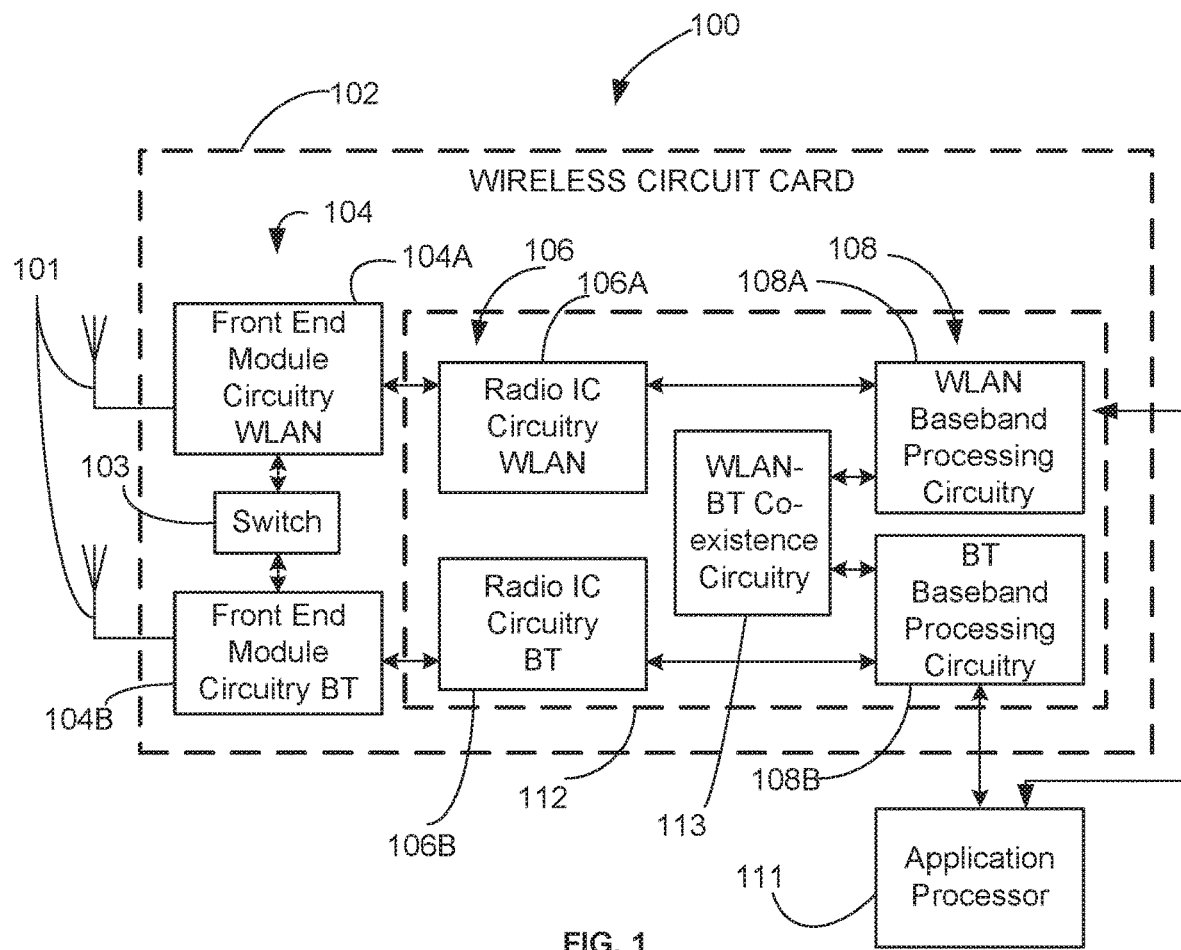
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
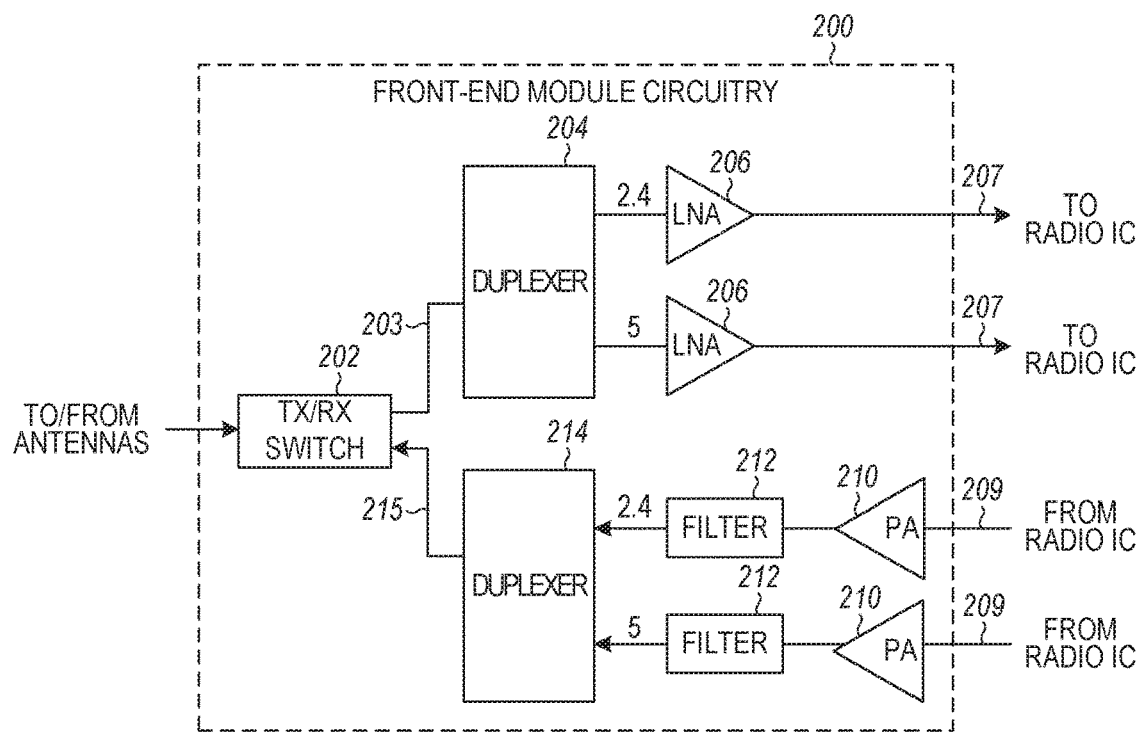
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
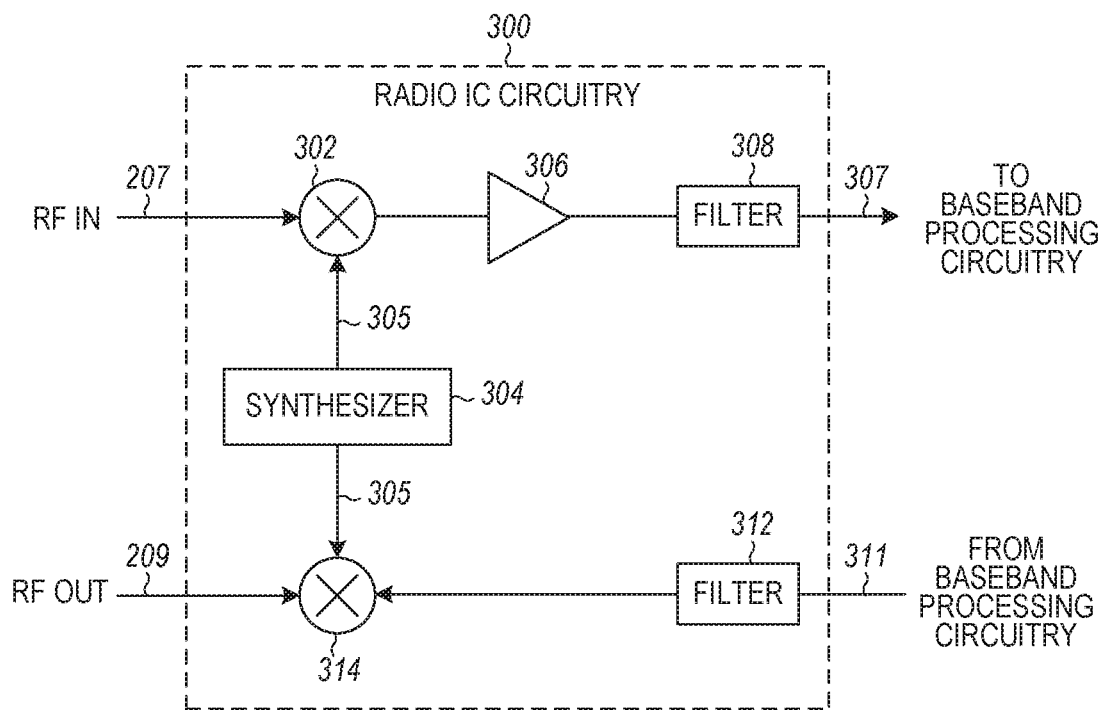
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
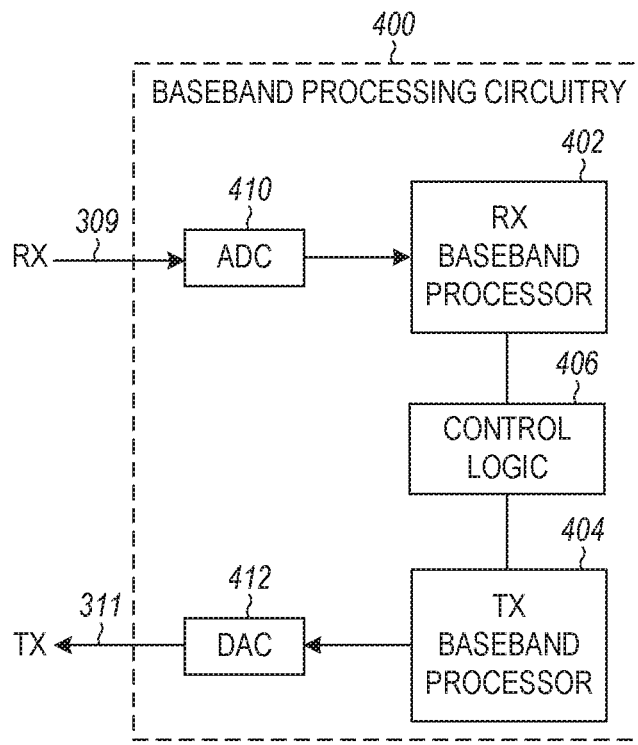
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
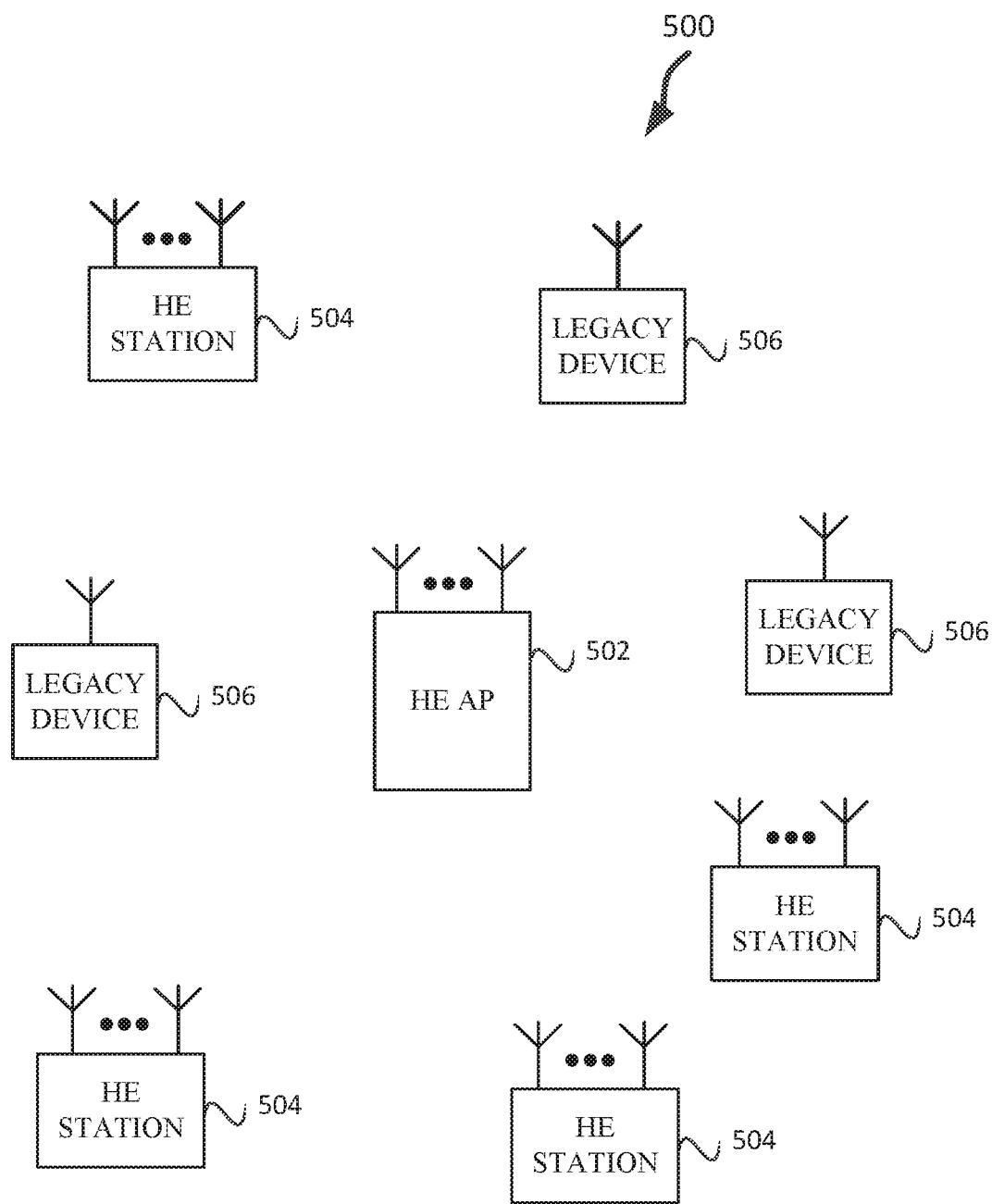
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of HE (e.g., IEEE 802.11ax) stations (STAs) 504, and a plurality of legacy (e.g., IEEE 802.11g/n/ac) devices 506. In some embodiments, the HE STAs 504 and/or HE AP 502 are configured to operate in accordance with IEEE 802.11 extremely high throughput (EHT). In some embodiments, the HE STAs 504 and/or HE AP 520 are configured to operate in accordance with IEEE 802.11az. In some embodiments, IEEE 802.11EHT may be termed Next Generation 802.11.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. HE AP 502 may be connected to the internet.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the HE AP 502 and HE STAs 504 are configured to operate in accordance with IEEE 802.11EHT, the legacy devices 506 may include devices that are configured to operate in accordance with IEEE 802.11ax. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the HE STAs 504 may be termed extremely high throughput (EHT) stations or stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g. IEEE 802.11EHT/ax embodiments, a HE AP 502 may operate as a master station which may be arranged to contend for a wireless medium (e.g., during a contention period) to receive exclusive control of the medium for a transmission opportunity (TXOP). The HE AP 502 may transmit a EHT/HE trigger frame transmission, which may include a schedule for simultaneous UL transmissions from HE STAs 504. The HE AP 502 may transmit a time duration of the TXOP and sub-channel information. During the TXOP, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the HE AP 502 may communicate with HE stations 504 using one or more HE or EHT frames. During the TXOP, the HE STAs 504 may operate on a sub-channel smaller than the operating range of the HE AP 502. During the TXOP, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 or IEEE 802.11EHT/ax communication techniques, although this is not a requirement.

In some embodiments the HE station 504 may be a "group owner" (GO) for peer-to-peer modes of operation. A wireless device may be a HE station 502 or a HE AP 502.

In some embodiments, the HE STA 504 and/or HE AP 502 may be configured to operate in accordance with IEEE 802.11mc. In example embodiments, the radio architecture of FIG. 1 is configured to implement the HE STA 504 and/or the HE AP 502. In example embodiments, the front-end module circuitry of FIG. 2 is configured to implement the HE STA 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-26.

In example embodiments, the HE station 504 and/or the HE AP 502 are configured to perform the methods and operations/functions described herein in conjunction with FIGS. 1-26. In example embodiments, an apparatus of the EHT station 504 and/or an apparatus of the HE AP 502 are configured to perform the methods and functions described herein in conjunction with FIGS. 1-26. The term Wi-Fi may refer to one or more of the IEEE 802.11 communication standards. AP and STA may refer to EHT/HE access point 502 and/or EHT/HE station 504 as well as legacy devices 506.

In some embodiments, a HE AP STA may refer to a HE AP 502 and/or a HE STAs 504 that is operating as a HE APs 502. In some embodiments, when a HE STA 504 is not operating as a HE AP, it may be referred to as a HE non-AP STA or HE non-AP. In some embodiments, HE STA 504 may be referred to as either a HE AP STA or a HE non-AP.

Figure 6:
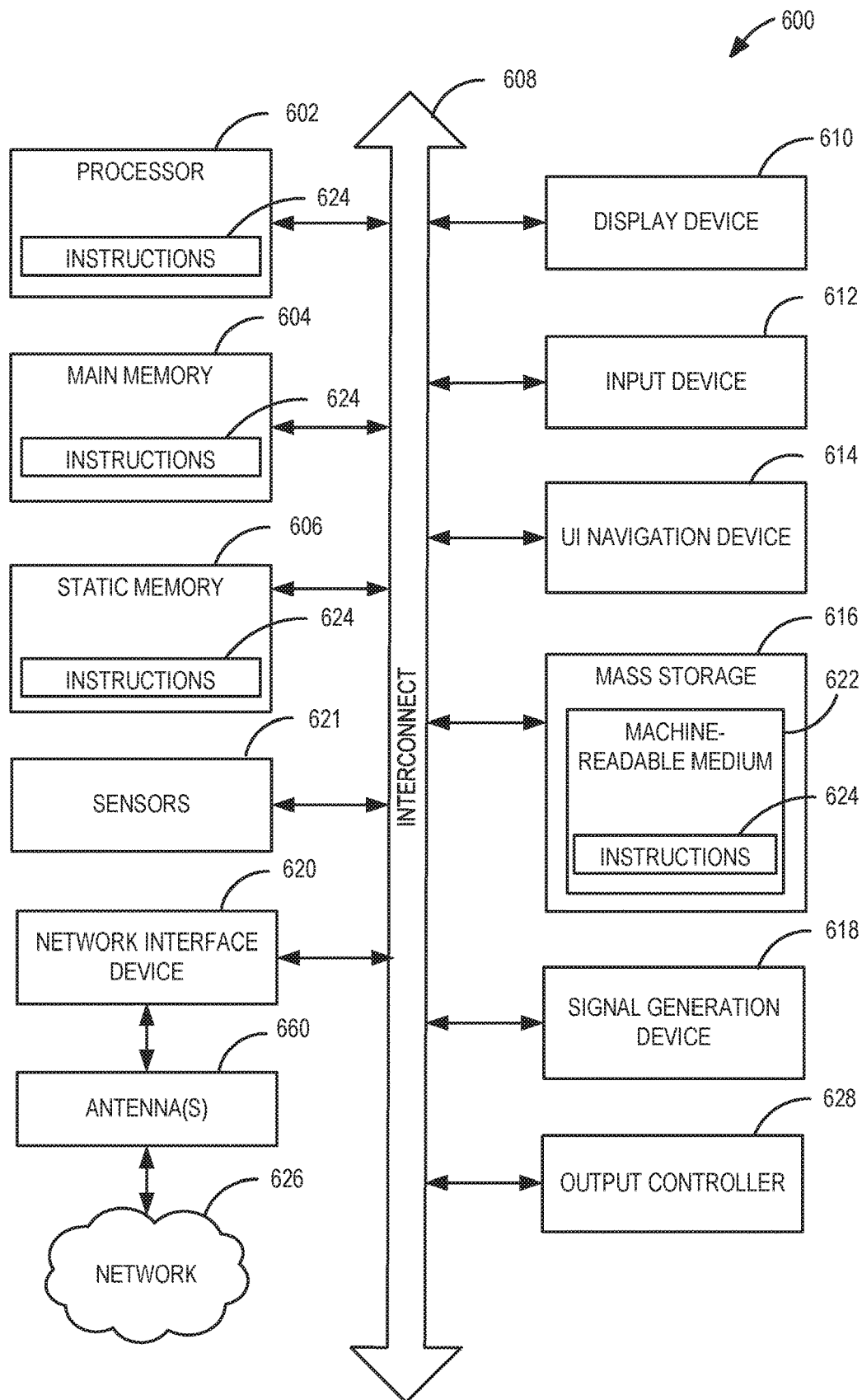
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
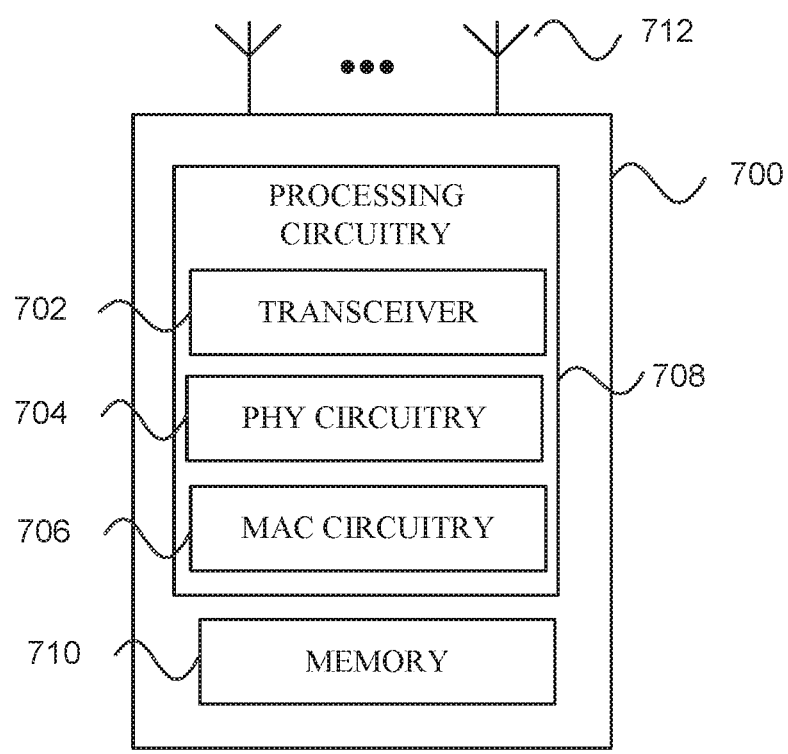
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium.

The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
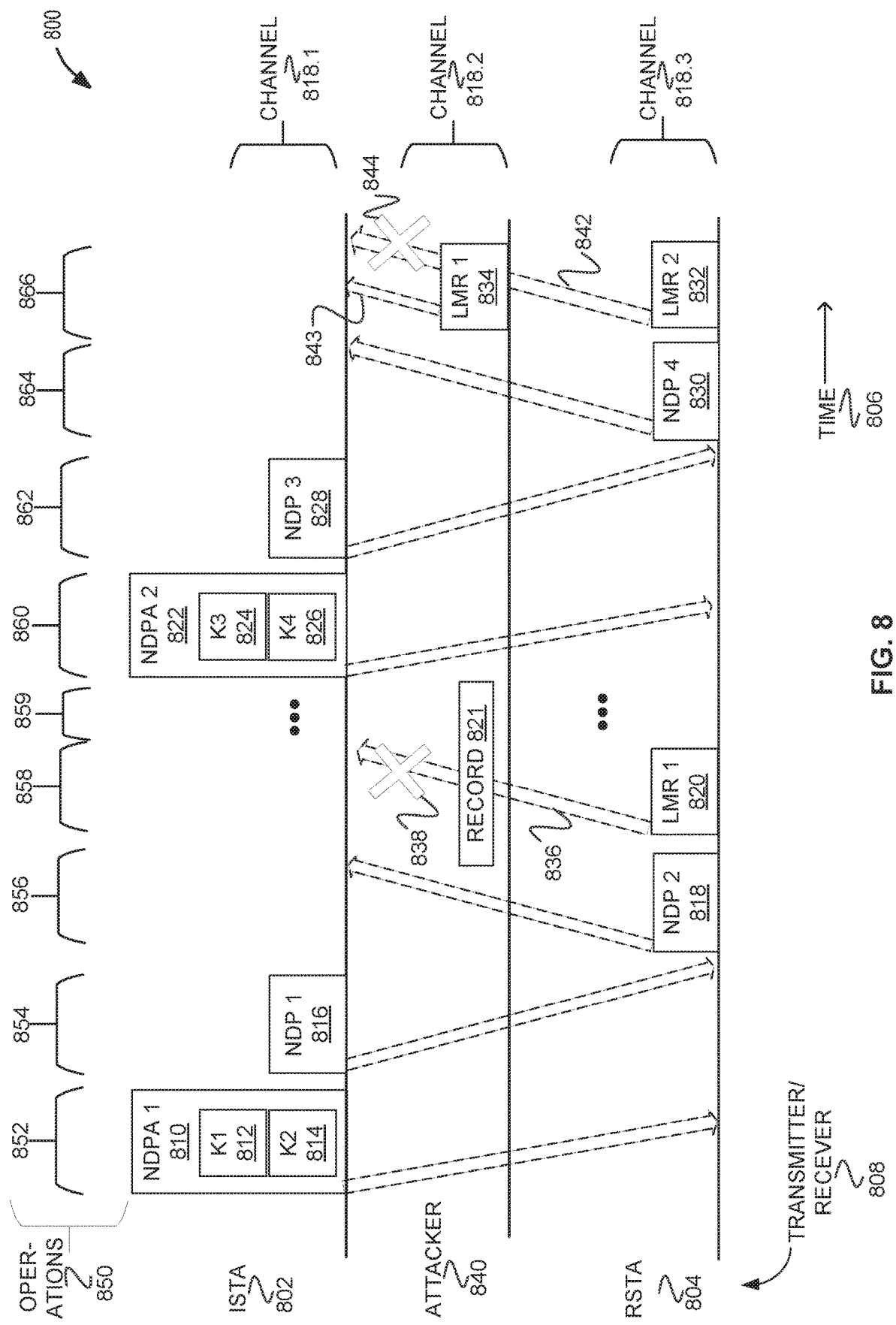
FIG. 8 illustrates a method of ranging with a replay attack in accordance with some embodiments.

FIG. 8 illustrates a method of ranging with a replay attack 800 in accordance with some embodiments. Illustrated in FIG. 8 is time 806 along a horizontal axis, transmitter/receiver 808, initiator STA (ISTA) 802, responder STA (RSTA) 804, channels 818, and operations 850 along the top. The dashed arrows (e.g., 836, 842) indicate transmissions.

The ISTA 802, RSTA 804, and/or Attacker 840 may be a HE STA 504 or HE AP 502 as described in conjunction with FIG. 5, e.g., ISTA and RSTA may be configured to operate in accordance with IEEE 802.11az. Channel 818.1, channel 818.2, and channel 818.3 may be a sub-band, e.g., 20 MHz, of a bandwidth, e.g., 320 MHz, and may be a number of tones or subcarriers. Channel 818.1, channel 818.2, and channel 818.3 may be the same channel. Channel 818.1, channel 818.2, and/or channel 818.3 may partially overlap.

Prior to the method as illustrated, there may be an initial fine timing measurement (FTM) initialization portion. During the initialization portion the ISTA 802 and RSTA 504 may agree to perform secure communications. Moreover, the ISTA 802 may contend for the wireless medium (not illustrated), e.g., channel 818.1. ISTA 802 may gain access to channel 818.1.

The method 800 may continue at operation 852 with ISTA 802 transmitting a NDP announcement (NDPA) 1 frame 810. NDPA 1 810 may include K1 812 and K2 814. K1 812 and K2 814 may be random seeds or keys. K1 812 and/or K2 814 may be used to generate one or more transmissions (e.g., NDP 1 816, NDP 2 818, and/or LMR 1 820) and/or verify that a received transmission was generated using K1 812 and/or K2 814. K1 812 and/or K2 814 may be combined together and/or with a key already exchanged between the ISTA 802 and RSTA 804.

Both Attacker 840 and RSTA 804 may receive the NDPA 1 810. In some embodiments, ISTA 802 is on a door and RSTA 804 is on a person. The ISTA 802 and RSTA 804 may periodically conduct ranging for security reasons. In some embodiments, LMR 1 820 and LMR 2 832 are encrypted.

The method 800 continues at operation 854 with ISTA 802 transmitting NDP 1 816 which may be generated based on one or both of K1 812 and K2 814. NDP 1 816 may have been transmitted a short interframe space (SIFS) after the end of transmitting NDPA 1 810.

The method 800 continues at operation 856 with RSTA 804 transmitting NDP 2 818, which may have been generated based on one or both of K1 812 and K2 814. The method 800 continues at operation 858 with RSTA 804 transmitting location measurement report (LMR) 1 820, which may indicate information about the reception of NDP 1 816 and the transmission of NDP 2 818, e.g., times so that ISTA 802 may determine a time-of-flight between ISTA 802 and RSTA 804. LMR 1 820 may be encrypted using K1 812, K2 814, and/or a key determined before operation 852. The transmission of LMR 1 820 may be represented by arrow 836.

Attacker 840 may block 838 the reception of LMR 1 820 by ISTA 802. The attacker 840 may wait for the user (RSTA 804) to be close to the door to block a LMR, e.g., LMR 1 820. The Attacker 840 may record 821 LMR 1 820 to transmit or replay at operation 866.

The method 800 may continue at operation 859, which indicates that operation 860 through operation 866 may be repeated a number of times until the Attacker 840 determines that a measurement token (e.g., K1 812 or K2 814, or a measurement token of NDPA 1 810 not illustrated) of NDPA 1 810 matches a measurement token (K3 824 or K4 826, or a measurement token of NDPA 2 822 not illustrated) of NDPA 2 822 as disclosed below.

The method 800 may continue at operation 860 with ISTA 802 transmitting NDPA 2 822. NDPA 2 822 may include K3 824 and/or K4 826. K3 924 and K4 826 may be the same or similar as K1 812 and/or K2 814, in accordance with some embodiments.

The method 800 may continue at operation 862 with the ISTA 802 transmitting NDP 3 828. NDP 3 828 may be generated based on one or both of K3 824 and K4 826. The method 800 may continue at operation 864 with ISTA 802 transmitting NDP 4 830, which may have been generated based on one or both of K3 824 and K4 826.

The method 800 may continue at operation 866 with RSTA 804 transmitting LMR 2 832, which may indicate information about the reception of NDP 3 828 and the transmission of NDP 4 830, e.g., times so that ISTA 802 may determine a time-of-flight between ISTA 802 and RSTA 804. LMR 2 832 may be encrypted. The encryption may use K3 824, K4 826, and/or a key determined before operation 852. The transmission of LMR 2 830 may be represented by arrow 842.

The Attacker 840 may be able to read a measurement token (e.g., K3 824 or K4 826, or a measurement token of NDPA 2 822 not illustrated) of NDPA 2 822 and determine that there is a match with a measurement token of NDPA 1 810 (e.g., K1 812, K2 814, or a measurement token of NDPA 1 810 not illustrated). The Attacker 840 may then replay or transmit (see arrow 843) LMR 1 834 (i.e., replay LMR 1 820) at a high power so that LMR 1 834 is received by ISTA 802 but LMR 2 832 is not.

The measurement token may cycle through values for each NDPA that is transmitted. In this way the Attacker 840 may fool the door (ISTA 802) into determining that the user (RSTA 804) is close (as evidenced by LMR 1 834) rather than far away as LMR 2 832 would indicate.

Figure 9:
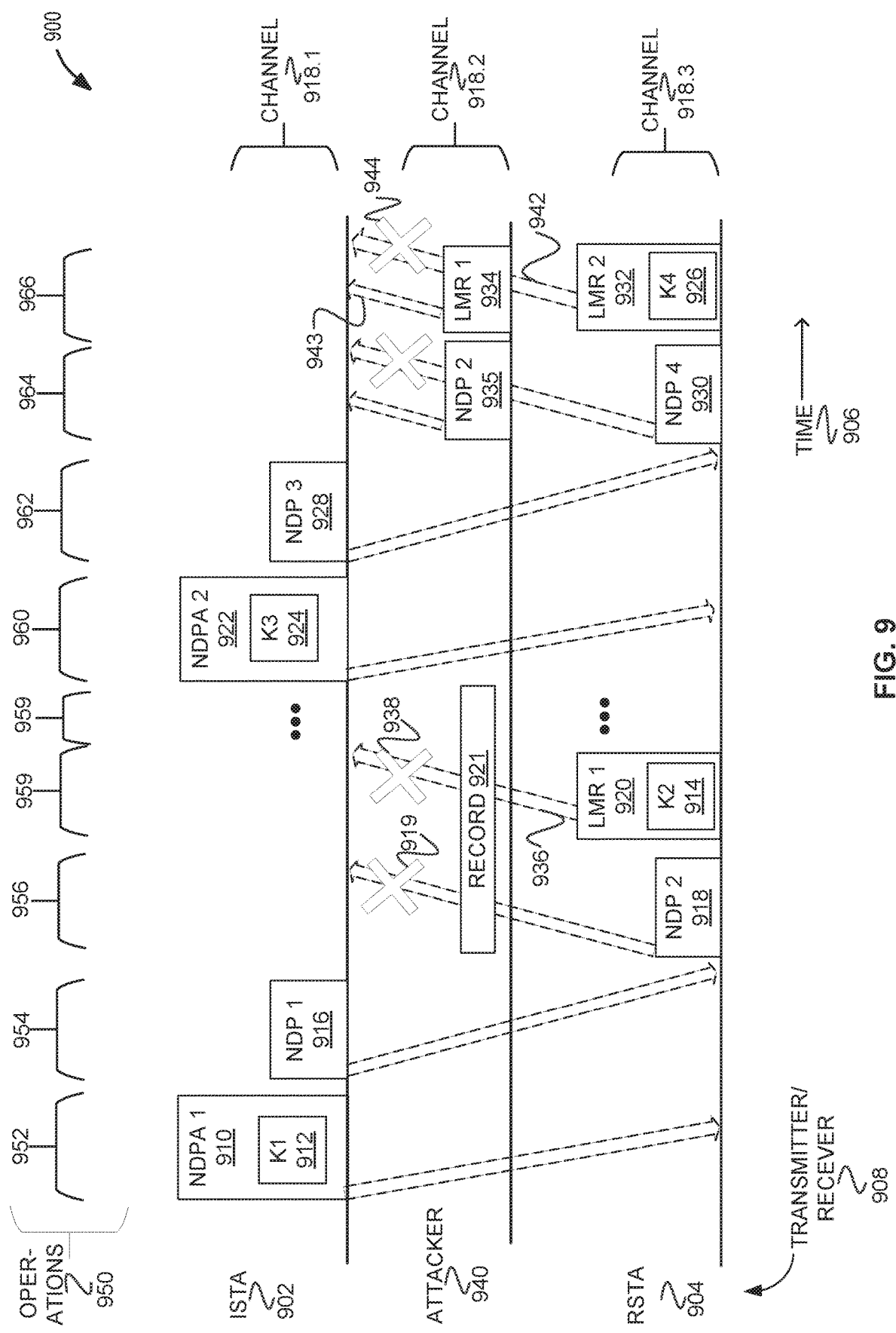
FIG. 9 illustrates a method of ranging with a replay attack in accordance with some embodiments.

FIG. 9 illustrates a method of ranging with a replay attack 800 in accordance with some embodiments. Illustrated in FIG. 9 is time 906 along a horizontal axis, transmitter/receiver 908, ISTA 902, RSTA 904, channels 918, and operations 950 along the top. The dashed arrows (e.g., 936, 942) indicate transmissions.

The ISTA 902, RSTA 904, and/or Attacker 940 may be a HE STA 504 or HE AP 502 as described in conjunction with FIG. 5, e.g., ISTA and RSTA may be configured to operate in accordance with IEEE 802.11az. Channel 918.1, channel 918.2, and channel 918.3 may be a sub-band, e.g., 20 MHz, of a bandwidth, e.g., 320 MHz, and may be a number of tones or subcarriers. Channel 918.1, channel 918.2, and channel 918.3 may be the same channel. Channel 918.1, channel 918.2, and/or channel 918.3 may partially overlap.

Prior to the method as illustrated, there may be an initial fine timing measurement (FTM) initialization portion. During the initialization portion the ISTAs 902 and RSTAs 904 may agree to perform secure communications. Moreover, the ISTA 902 may contend for the wireless medium (not illustrated), e.g., channel 818.1. ISTA 902 may gain access to channel 818.1.

The method 900 may continue at operation 952 with ISTA 902 transmitting a NDPA 1 frame 910. NDPA 1 910 may include K1 812. K1 912 may be a random seed or key. K1 912 may be used to generate NDP 1 and/or verify that a received transmission was generated using K1 912. K1 912 may be combined with a key already exchanged between the ISTA 902 and RSTA 904.

Both Attacker 940 and RSTA 904 may receive the NDPA 1 910. In some embodiments, ISTA 902 is on a door and RSTA 904 is on a person. The ISTA 902 and RSTA 904 may periodically conduct ranging for security reasons. In some embodiments, LMR 1 920 and LMR 2 932 are encrypted.

The method 800 continues at operation 954 with ISTA 902 transmitting NDP 1 916 which may be generated based on one or both of K1 812. NDP 1 916 may have been transmitted a SIFS after the end of transmitting NDPA 1 910.

The method 900 continues at operation 956 with RSTA 904 transmitting NDP 2 918, which may have been generated based on K2 914. The method 900 continues at operation 958 with RSTA 904 transmitting LMR 1 920, which may indicate information about the reception of NDP 1 816 and the transmission of NDP 2 818, e.g., times so that ISTA 802 may determine a time-of-flight between ISTA 802 and RSTA 804. LMR 1 820 may include K2 914, which may be used to generate NDP 2 918. The transmission of NDP 2 918 and LMR 1 920 may be represented by arrows 919 and 936, respectively.

Attacker 940 may block 919 and 938 the reception of NDP 2 918 and LMR 1 820, respectively, by ISTA 902. The attacker 940 may wait for the user (RSTA 804) to be close to the door to block a LMR, e.g., LMR 1 920. The Attacker 940 may record 921 NDP 2 918 and LMR 1 920 to transmit or replay at operations 964 and 966, respectively.

The method 900 may continue at operation 959, which indicates that operations 960 through operation 966 may be repeated a number of times until the Attacker 940 determines that a measurement token (e.g., K1 912, and/or K2 914) of NDPA 1 910 and LMR 1 920 matches a measurement token (K3 924 or K4 926). In some embodiments, K1 912 (which may be used cyclically) must just match K3 924.

The method 900 may continue at operation 960 with ISTA 902 transmitting NDPA 2 922. NDPA 2 922 may include K3 924. K3 924 may be the same or similar as K1 912, in accordance with some embodiments.

The method 900 may continue at operation 962 with the ISTA 902 transmitting NDP 3 928. NDP 3 928 may be generated based on K3 924. The method 900 may continue at operation 964 with ISTA 902 transmitting NDP 4 930, which may have been generated based on K4 926.

The Attacker 940 may determine that K1 912 and K3 924 are a match and that the person (RSTA 904) is far away from ISTA 902. The Attacker 940 may block NDP 4 930 by waiting for RSTA 904 to be far from ISTA 902. The Attacker 940 may replay or transmit NDP 2 935 (NDP 2 918). By replaying both NDP 918 (NDP 2 935) and LMR 1 920, ISTA 902 will use K2 914 to interpret NDP 2 935.

The method 900 may continue at operation 966 with RSTA 904 transmitting LMR 2 932, which may include K4 926. K4 926 may be the same or similar as K2 914. LMR 2 932 may indicate information about the reception of NDP 3 928 and the transmission of NDP 4 930, e.g., times so that ISTA 902 may determine a time-of-flight between ISTA 902 and RSTA 904. LMR 2 932 may be encrypted using K4 926. The transmission of LMR 2 930 may be represented by arrow 942.

The Attacker 940 may be able to read a measurement token (e.g., K3 924) of NDPA 2 922 and determine that there is a match with a measurement token of NDPA 1 910 (e.g., K1 912). The Attacker 940 may then replay or transmit (see arrow 943) LMR 1 934 (i.e., replay LMR 1 920) at a higher power (than RSTA 904 is using) so that LMR 1 934 is received by ISTA 902 but LMR 2 932 is not received by ISTA 902. LMR 1 934 may include K2 914, which is not illustrated in LMR 1 934.

The measurement token may cycle through values for each NDPA that is transmitted. In this way the Attacker 940 may fool the door (ISTA 902) into determining that the user (RSTA 904) is close (as evidenced by LMR 1 934) rather than far away as LMR 2 932 would indicate.

Figure 10:
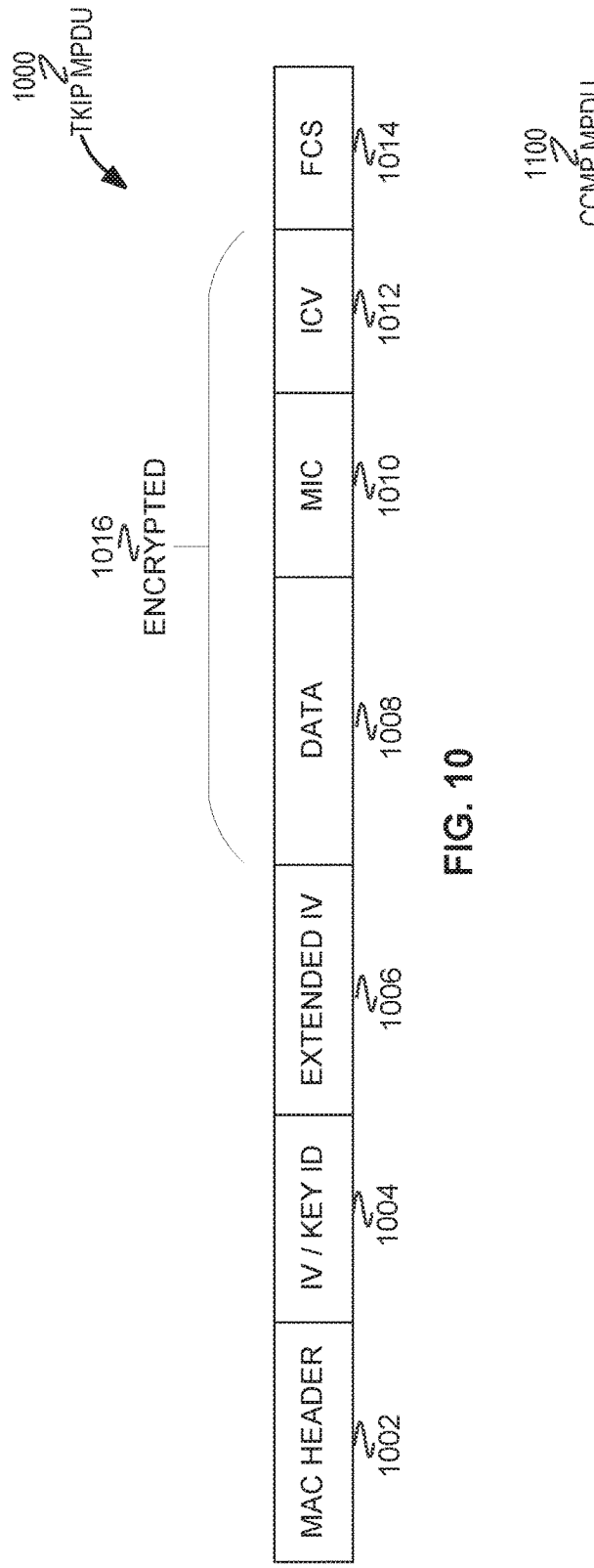
FIG. 10 illustrates a Temporal Key Integrity Protocol (TKIP) MPDU 1000, in accordance with some embodiments.

FIG. 10 illustrates a Temporal Key Integrity Protocol (TKIP) MPDU 1000, in accordance with some embodiments. Illustrated in FIG. 10 is MAC header 1002, initialization vector (IV)/Key ID 1004, extended IV 1006, data 1008, message integrity check (MIC) 1010, integrity check value (ICV), and frame check sequence (FCS).

The MAC header 1002 may be a header for the TKIP MPDU 1000, which include fields addresses (address 1, address 2, address 3), which may include address of the transmitter and receiver, frame control, duration, optional sequence information, optional quality of service (QoS) information, optional high-throughput (HT) control fields, etc.

The IV/Key ID 1004 and extended IV 1006 may be a starting variable for starting a pseudorandom keystream. The IV/Key ID 1004 may include some bits for an IV and some bits for the Key ID. The IV portion and the IV 1006 may vary for each MPDU or packet. The extended IV 1006 may be an extended portion of the IV portion of the IV/Key ID 1004. The data 1008 may be data such as a frame, e.g., NDPA (e.g., 910), or LMR (e.g., 932). The MIC 1010 may be a cryptographic integrity check hashing algorithm to detect frame forgeries. The source address of the transmitter of the TKIP MPDU 1000 may be included in the MIC 1010. The ICV 1012 be a hash value of a portion of the contents of the PKIP MDPU 1000 before encryption. The FCS 1014 may include information for checking if there were errors in the transmission of the transmission of the PKIP MPDU 1000. Data 1008, MIC 1010, and ICV 1012 may be encrypted using an encryption key identified by the Key ID portion of IV/Key ID 1004 and the IV portion of IV/Key ID 1004 and extended IV 1006.

Figure 11:
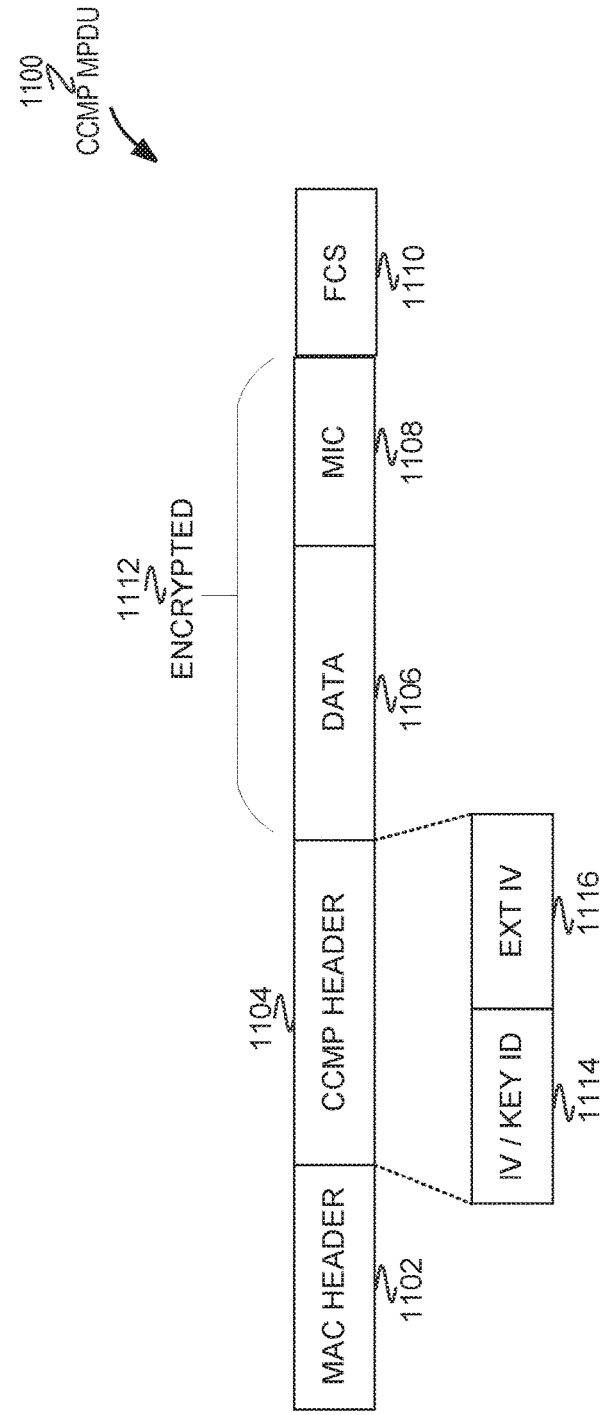
FIG. 11 illustrates a counter mode cipher block chaining (CBC) message authentication code (MAC) protocol (CCMP) medium access control (MAC) protocol data unit (MPDU), in accordance with some embodiments.

FIG. 11 illustrates a counter mode cipher block chaining (CBC) message authentication code (MAC) protocol (CCMP) medium access control (MAC) protocol data unit (MPDU) 1100, in accordance with some embodiments. Illustrated in FIG. 11 is MAC header 1102, CCMP header 1104, data 1106, MIC 1108, FCS 1110, and encrypted 1112. The MAC header 1102 may be a header for the CCMP MPDU 1100, which may include fields addresses (address 1, address 2, address 3), which may include address of the transmitter and receiver, frame control, duration, optional sequence information, optional quality of service (QoS) information, optional high-throughput (HT) control fields, etc.

The CCMP header 1104 may include IV/Key ID 1114 and extended (EXT) IV 1116. IV/Key ID 1114 and extended IV 1116 may be a starting variable for starting a pseudorandom keystream. The IV/Key ID 1114 may include some bits for an IV and some bits for the Key ID. The IV portion and the IV 1116 may vary for each MPDU or packet. The extended IV 1116 may be an extended portion of the IV portion of the IV/Key ID 1114. The data 1106 may be data such as a frame, e.g., NDPA (e.g., 910), or LMR (e.g., 932). The MIC 1108 may be a cryptographic integrity check hashing algorithm to detect frame forgeries. The source address of the transmitter of the CCMP MPDU 1100 may be included in the MIC 1108. The FCS 1110 may include information for checking if there were errors in the transmission of the transmission of the CCMP MPDU 1100. Data 1006 and MIC 1108 may be encrypted using an encryption key identified by the Key ID portion of IV/Key ID 1114 and the IV portion of IV/Key ID 1116 and extended IV 1116.

Figure 12:
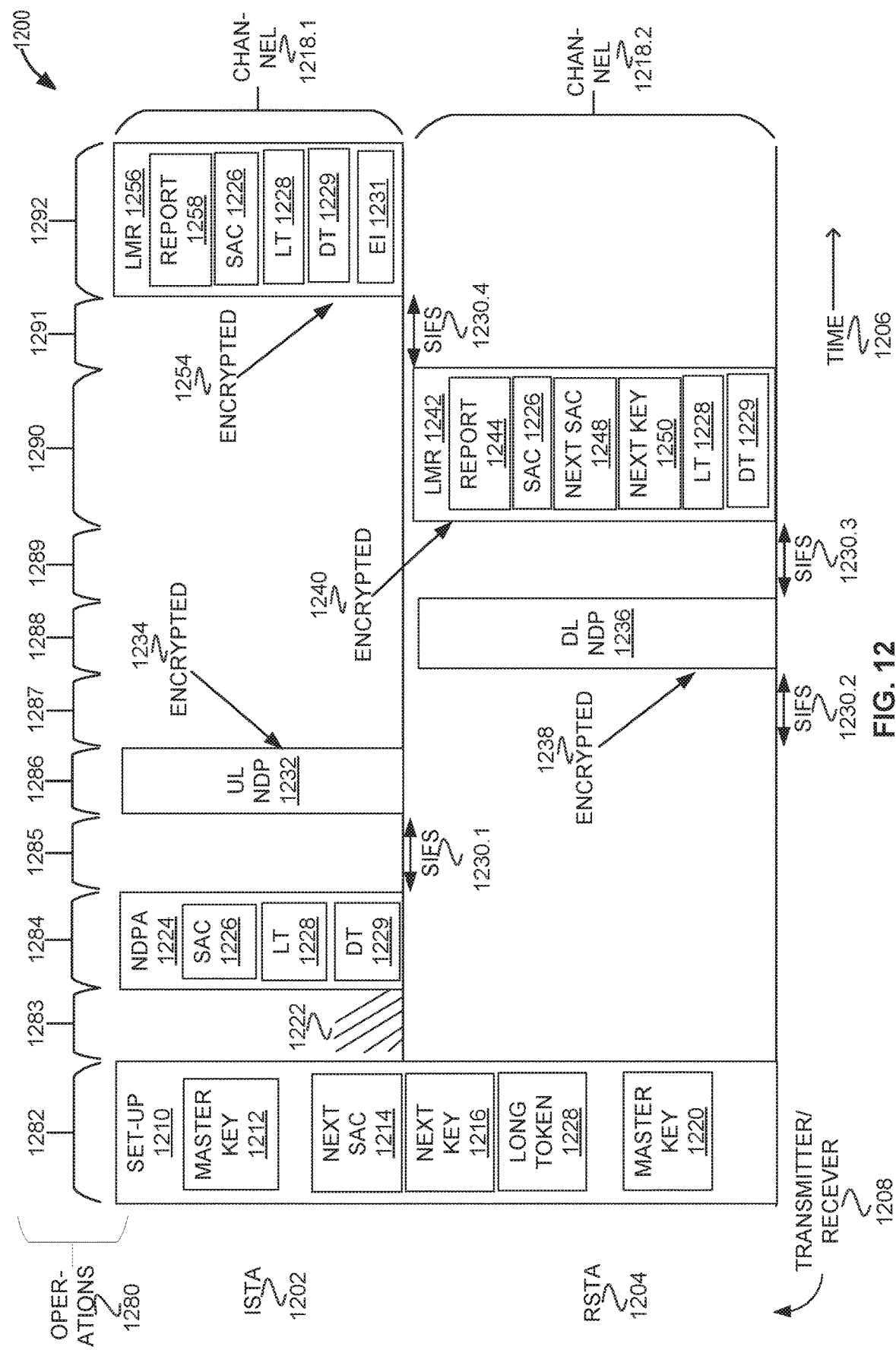
FIG. 12 illustrates a method for authenticating ranging devices, in accordance with some embodiments.
Figure 13:
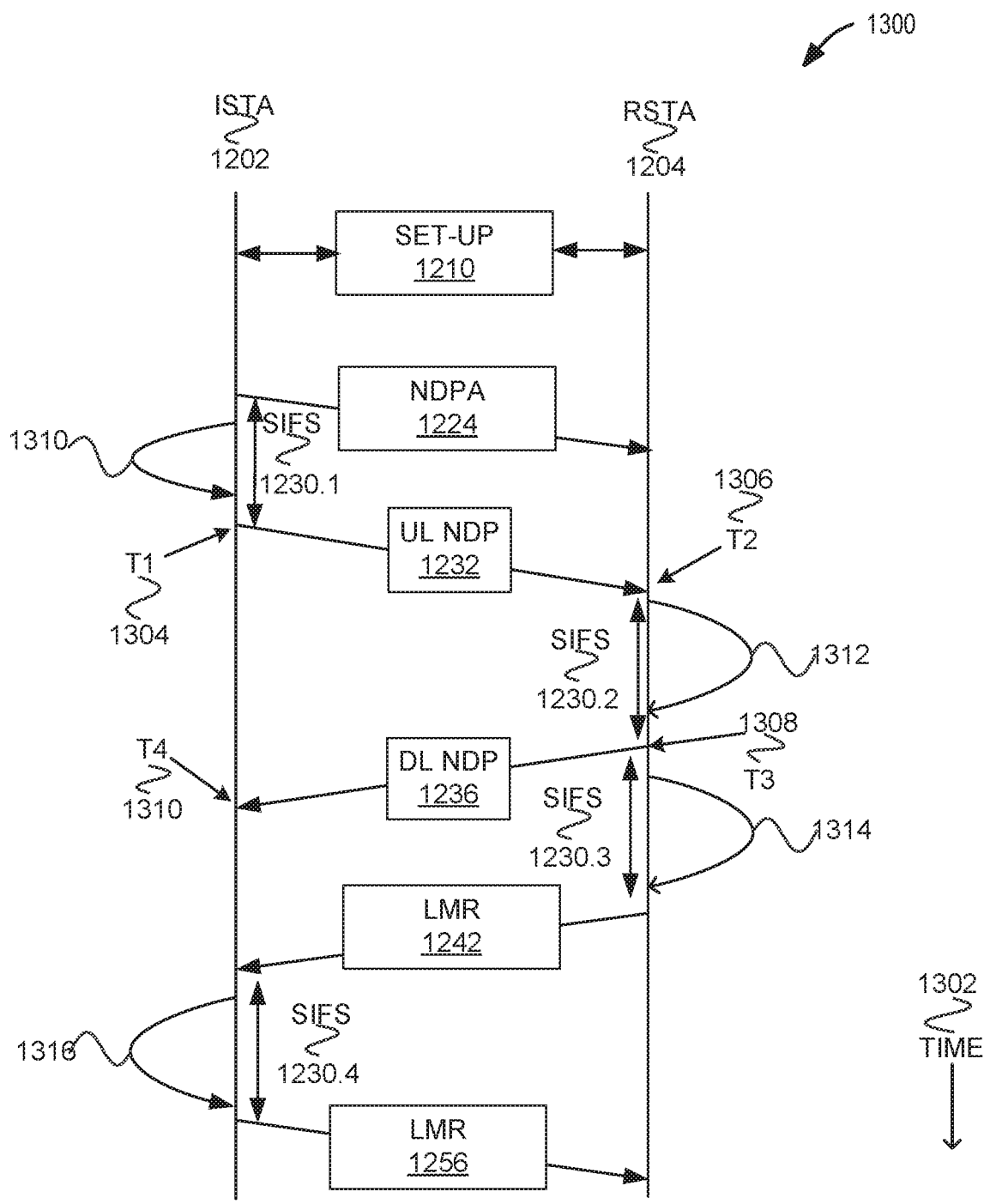
FIG. 13 illustrates a method for authenticating ranging device, in accordance with some embodiments.

FIGS. 12-16 are disclosed in conjunction with one another. FIG. 12 illustrates a method 1200 for authenticating ranging devices, in accordance with some embodiments. FIG. 13 illustrates a method 1300 for authenticating ranging device, in accordance with some embodiments. Illustrated in FIG. 12 is time 1206 along a horizontal axis, transmitter/receiver 1208, ISTA 1202, RSTA 1204, channels 1218, and operations 1280 along the top. Illustrated in FIG. 13 is ISTA 1202, RSTA 1204, and time 1302 along a vertical axis.

The ISTA 1202 may be a HE STA 504 or HE AP 502 as described in conjunction with FIG. 5, e.g., ISTA 1202 and RSTA 1204 may be configured to operate in accordance with IEEE 802.11az. Channel 1218.1 and channel 1218.2 may be a sub-band, e.g., 20 MHz, of a bandwidth, e.g., 320 MHz, and may be a number of tones or subcarriers. Channel 1218.1 and channel 1218.2 may be the same channel. For illustration convenience, channel 1218.1 and channel 1218.2 are illustrated with different sizes, but channel 1218.1 and channel 1218.2 may be the same bandwidth and may be the same channel. Channel 1218.1 and channel 1218.2 may partially overlap.

The method 1200 begins at operation 1282 with set-up 1210. ISTA 1202 and RSTA 1204 may perform operations for fine time measurements (FTM)s. The set-up 1210 may be a FTM negotiation or another set-up or negotiation for FTMs. The ISTA 1202 and RSTA 1204 may derive a master key 1212 for the ISTA 1202 and a master key 1220 for the RSTA 1204. In some embodiments, the master key 1212 and master key 1220 are the same. The set-up 1210 may include a pairwise transient key security association (PTKSA), which may be the result of 4-way handshake, FT 4-way handshake, fast basic service set (BSS) transition (FT) protocol, or FT resource request protocol, FILS authentication, pre-association security negotiation (PASN) authentication, CCMP, or anther protocol. The master key 1212 and 1220 may be derived from the PTKSA. The master keys 1212, 1220 may be CCMP keys. The master keys 1212, 1220 may have a limited lifetime. The master keys 1212, 1220 may be Pairwise Transient Keys (PTK) and/or Pairwise Master Keys (PMKs). In some embodiments, the master keys 1212, 1220 may be Group Transient Keys (GTKs). In some embodiments, the master keys 1212, 1220 may be more than one key each.

Figure 15:
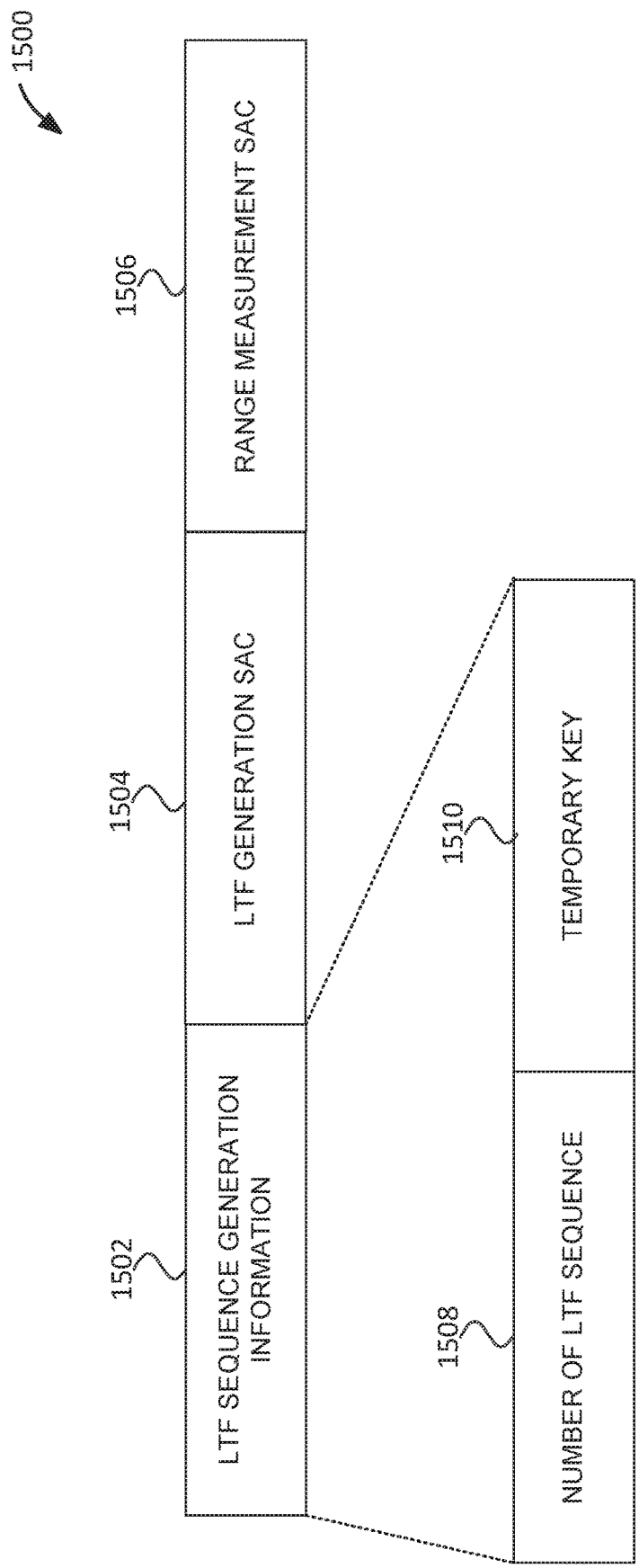
FIG. 15 illustrates a secure LTF parameter element, in accordance with some embodiments.

In some embodiments, the set-up 1210 may include negotiating or determining that the FTM will be a secure FTM (e.g., as illustrated in FIG. 12). In some embodiments, the set-up 1210 may include the exchange of secure LTF parameters element 1500 as disclosed in conjunction with FIG. 15. FIG. 15 illustrates a secure LTF parameter element 1500, in accordance with some embodiments. For example, the secure LTF parameters element 1500 may include LTF sequence generation information 1502, a LTF generation sequence authentication code (SAC) 1504, and a range measurement SAC 1506. The LTF sequence generation information 1502 may include a temporary key 1510 (e.g., initial vector (IV) for a cipher), a sounding bandwidth indication, and a number of a secure LTF sequence 1508. The LTF generation SAC 1504 may be a SAC used to generate a current or next FTM round or a current or next secure range measurement round. The LTF generation SAC 1504 may be associated with the LTF sequence generation information 1502 and may be a number that may identify the LTF generation SAC field 1504 and/or the LTF sequence generation information 1502 for a next FTM. The LTF generation SAC 1504 may be the identifier of the LTF sequence generation information 1502. The range measurement SAC field 1506 may be a number that may identify the LTF sequence generation information of the current or previous FTM round or a current or previous secure range measurement round. In the set-up phase 1210, since there is no measurement yet, the LTF generation SAC 1504 and the range measurement SAC 1506 in a secure LTF parameters element 1500 may be set to be the same that may be a part of the identifier of the upcoming measurement round. In the measurement phase (e.g., operations 1284 through 1290), the secure LTF parameters element 1500 may be included in the LMR 1242, 1256 in FIGS. 12 and 13. The range measurement SAC 1506 may be used as an identifier (e.g., used to identify a measurement round to prevent reply attacks) of the current measurement round whose NDP sounding frames were just sent, and the LTF generation SAC 1504 may be a part of the identifier of the next measurement round.

The RSTA 1204 and/or ISTA 1202 may be configured to identify a round of measurements (e.g., operations 1284 through 1292, which may include additional operations or may not include all the operations 1284 through 1292) by using information in the NDPA 1284 and/or LMR 1242. The RSTA 1204 and/or ISTA 1202 may not respond to a NDPA 1224 or LMR 1242 if the RSTA 1204 and/or ISTA 1202 determines the identification is not valid, e.g., if an identification indicates that the identification has recently (or ever) been used previously. This may indicate a reply attack. In some embodiments, the RSTA 1204 and/or ISTA 1202 may indicate in the LMR 1242, 1256 in the error indication field 1231 that an error occurred. In some embodiments, the RSTA 1204 and/or ISTA 1202 may indicate the type of error as being that the identification of the measurement round is not valid or a duplicate. The identification may include the dialog token 1229 and the SAC 1226 (or the next SAC 1248), e.g., the LTF generation SAC 1504 or the range measurement SAC 1506. The identification may have more entries (e.g., values) than the legacy dialog token that has 8 bits. This may make it harder for the attacker to find a match between recorded identifications and the identification of the current measurement, which will make it harder for an attacker to attack with a replay attack.

LTF generation SAC 1504 or range measurement SAC 1506 may represent the values of SAC 1406, next SAC 1214, SAC 1226, or next SAC 1248. LTF sequence generation information 1502 may represent the next key 1216 or next key 1250. The NDP 1600 may include one or more additional fields.

The next SAC 1214 may be an identifier for the next key 1216. The next key 1216 may be a temporary key to use in a next FTM, e.g., operations 1284 through 1290 in FIG. 12. The next SAC 1214 may be a LTF generation SAC 1504. The next key 1216 may be temporary key 1510, in accordance with some embodiments. The long token 1228 may be a number of LTF sequences 1508, in accordance with some embodiments. The long token field 1228 may be an identification of the measurement round between the ISTA 1202 and the RSTA 1204, which may consist of a dialog token 1229 and the SAC 1226 (or next SAC 1248), which may be the LTF generation SAC used to generate the encrypted NDPs (UL NDP 1232, and DL NDP 1236) of the measurement round. In some embodiments, long token 1228 is a reference to SAC 1226 and dialog token 1229, in NDPA 1224, LMR 1242, and LMR 1256, where the SAC 1226 is used to generate the encrypted UL NDP 1232 and DL NDP 1236. In some embodiments, long token 1228 is a field that includes SAC 1226 and dialog token 1229. In some embodiments, the long token field 1228 may be 16 to 64 bits, e.g., 56 bits.

The method 1200 may continue at operation 1283 with the ISTA 1202 contending for the wireless medium 1222, e.g., channel 1218.1. The method 1200 continues at operation 1284 with ISTA 1202 transmitting a NDP announcement (NDPA) frame 1224. A duration field (not illustrated) of the NDPA frame 1224 may indicate a transmission opportunity (TXOP) duration that may extend to the end of the transmission of LMR 1242 or LMR 1256. The NDPA 1224 frame may include one or more of a SAC field 1226, a long token field 1228, and/or a dialog token (DT) 1229. The NDPA 1224 may include other fields that are not illustrated such as described herein. The long token field 1228 may include a SAC field 1226 and a dialog token field 1229. The dialog token field 1229 may be eight bits and may be incremented by one for each sounding. The LT 1228 may be used to identify a sounding, e.g., to identify a LMR 1242, which may prevent replay attacks. The SAC field 1226 may be termed a sounding dialogue token number, in accordance with some embodiments. The SAC field 1226 may be a number that indicates a temporary key or random seed (e.g., temp key 1404) that will be used to determine the UL NDP 1232, e.g., LTF sequence 1410. The NDPA frame 1224 may be addressed to RSTA 1204, e.g., a receiver address (RA) field (not illustrated) may include a MAC address that addresses RSTA 1204 and/or a STA Info field may include an AID field that addresses RSTA 1204. The NDPA frame 1224 may address other RSTAs (not illustrated). The NDPA frame 1224 may include an indication of the RSTA 1204, an indication of the resource allocations (e.g., a frequency allocation or channel and spatial stream allocation) for the UL NDP 1232, and an indication of the resource allocations for the DL NDP 1236.

FIG. 13 illustrates the transmitting of set-up 1210 and the transmitting of NDPA 1224. The method 1200 continues at operation 1285 with waiting a short interframe space (SIFS) 1230.1. FIG. 13 illustrates ISTA 1202 waiting SIFS 1230.1.

Figure 16:
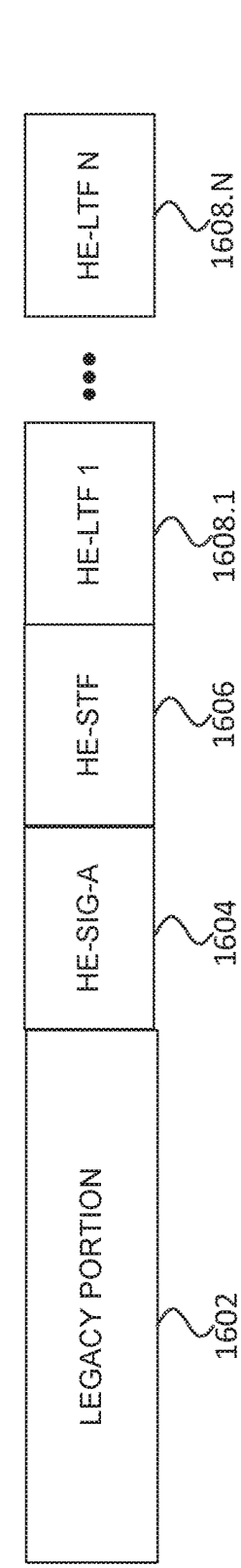
FIG. 16 illustrates a null data packet (NDP) in accordance with some embodiments.

FIG. 16 illustrates a null data packet (NDP) 1600 in accordance with some embodiments. Illustrated in FIG. 16 is legacy portion 1602, HE-signal (SIG)-A 1604, HE-short training field (STF) 1606, and HE-LTF 1 1608.1 through HE-LTF N 1608.N. The legacy portion 1602 may include one or more legacy field. The HE-SIG-A 1604 may include information regarding decoding the NDP 1600. The HE-STF 1606 may be a short training field. The HE-LTF 1608.1 through HE-LTF 1608.N may be training fields that in secure mode are generated using a LTF sequence 1410 as disclosed in conjunction with FIG. 14.

Figure 14:
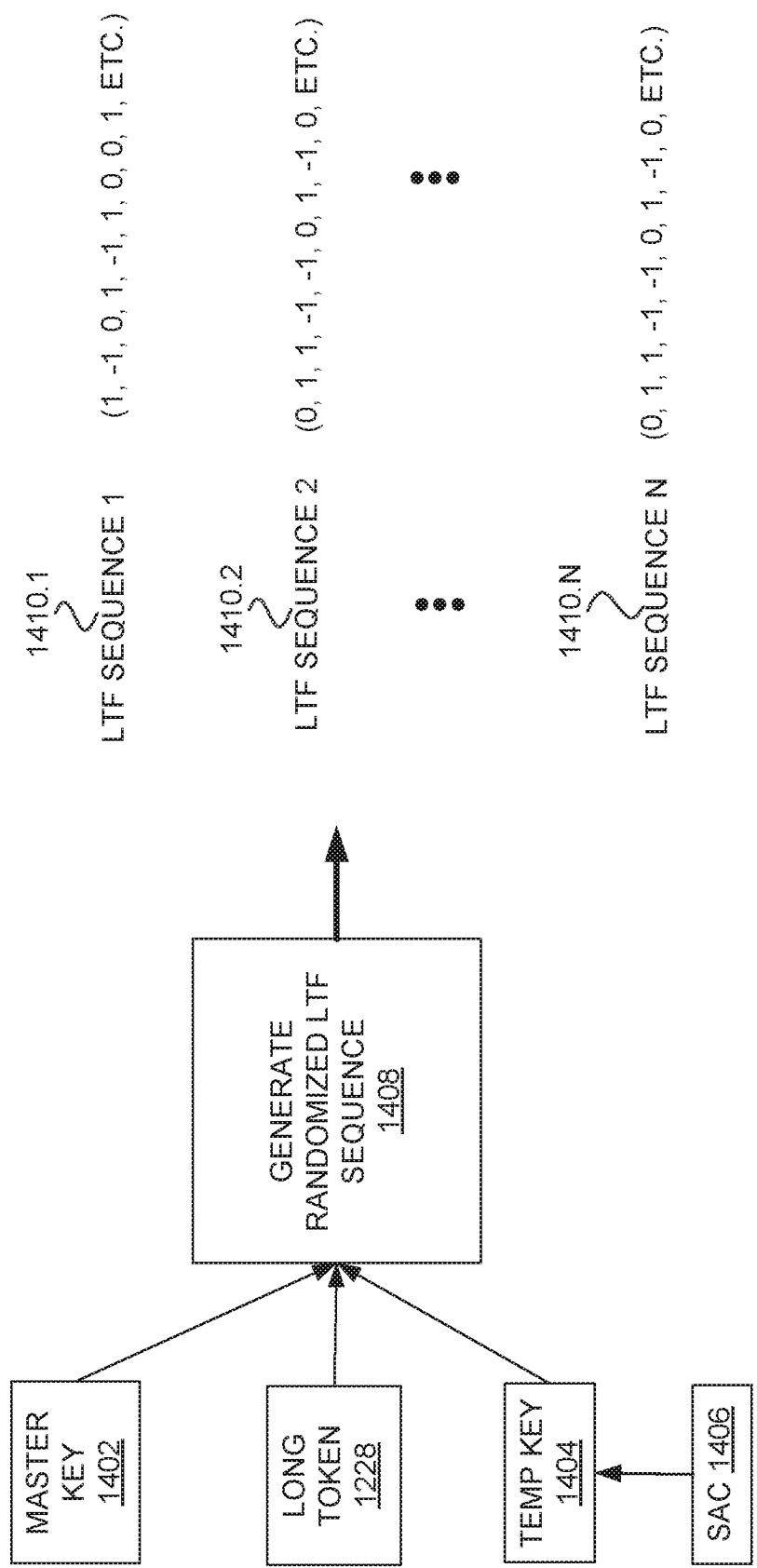
FIG. 14 illustrates generation of long-training field (LTF) sequences, in accordance with some embodiments.

FIG. 14 illustrates generation of long-training field (LTF) sequences 1410, in accordance with some embodiments. Illustrated in FIG. 14 is master key 1404, temp key 1404, SAC 1406, long token 1228, generate randomized LTF sequence 1408, and LTF sequences 1 1410.1 through LTF sequence N 1410.N. In some embodiments, the long token 1228 is the dialog token 1229. The master key 1404 may be master key, e.g., 1212, 1220. The temp key 1404 may be a temporary key, e.g., LTF sequence generation information 1502 (e.g., temporary key 1510) or next key 1216, 1250. The SAC 1406 may be a SAC associated with the temp key 1404, e.g., next SAC 1214 is associated with next key 1216, and next SAC 1248 is associated with next key 1250. The long token 1228 may be a number of LTF sequence 1508 or another value that indicates a sequence number of the FTM illustrated in FIG. 12. In some embodiments, one or more values from TKIP MPDU 1000 and/or CCMP MPDU 1100 may be used to generate the LTF sequences 1410.

The generate randomized LTF sequence 1408 may generate LTF sequence 1 1410.1 through LTF sequence N 1410.N. The LTF sequences 1410 may be used to generate HE-LTF 1 1608.1 through HE-LTF N 1608.N. The LTF sequences 1410 may be 1's, 0's, −1's, or complex numbers. The LTF sequences 1410 may be used to generate a waveform for the HE-LTFs 1608 of the NDP 1600. Generate randomized LTF sequence 1408 may use one or more of: master key 1402, long token 1228, and temp key 1404 to generate a cipher (e.g., a cipher string) to generate the LTF sequences 1410, in accordance with some embodiments. In some embodiments, other values may be used in conjunction with one or more of master key 1402, long token 1228, and temp key 1404 to generate the LTF sequences 1410, e.g., a key or value from TKIP MPDU 1000 (or TKIP encryption value) and/or a value from CCMP MPDU 1100 (or a CCMP encryption value.)

Returning to FIGS. 12 and 13, the method 1200 may continue at operation 1286 with ISTA 1202 transmitting UL NDP 1232, which may be encrypted 1234 as described in conjunction with FIG. 14. At operation 1310, ISTA 1202 may encrypt UL NDP 1232. For example, UL NDP 1232 may be a NDP 1600. ISTA 1202 may generate a randomized LTF sequences 1410 as described in conjunction with FIG. 14 and generate the UL NDP 1232 using the randomized LTF sequences 1410.

The RSTA 1204 may receive UL NDP 1232 and determine whether UL NDP 1232 is authentic or counterfeit. RSTA 1204 may determine whether UL NDP 1232 is authentic or not because a counterfeit or rogue ISTA 1202 may send rouge NDPAs 1224 and/or UL NDPs 1232 and use the DL NDP 1236 returned to try and determine the master key 1220, long token 1228, and/or next key 1216.

The RSTA 1204 may if it is determined that UL NDP 1232 is counterfeit, not transmit DL NDP 1236, not transmit a fake DL NDP 1236 (i.e., with the wrong keys), not transmit LMR 1242, and/or transmit LMR 1242 with an indication in the report 1244 that there was a problem (e.g., error indication, EI, 1231), which may include an indication that the UL NDP 1232 may be counterfeit and/or wrong keys have been used to generate the UL NDP 1232.

The method 1200 may continue at operation 1287 with the RSTA 1204 waiting a SIFS 1203.2. The method 1200 may continue at operation 1288 with the RSTA 1204 generating and transmitting the DL NDP 1236. For example, the RSTA 1204 may use master key 1220, next key 1216, and/or long token 1228 to generate randomized LTF sequences 1410 of DL NDP 1236 (e.g., HE-LTFs 1608).

The method 1200 may continue at operation 1289 with the RSTA 1204 waiting a SIFS 1230.3 before transmitting the LMR 1242. The method 1200 may continue at operation 1290 with the RSTA 1204 transmitting the LMR 1242. The RSTA 1204 at operation 1314 (e.g., during the SIFS 1230.3) may prepare LMR 1242. The LMR 1242 may include a report 1244, which include times T2 1306 and T3 1308. ISTA 1202 will then have T1 1304, T2 1306, T3 1308, and T4 1310. ISTA 1202 may then determine a Round Trip Time (RTT) in accordance with equation (1): $RTT=[(T4-T1)-(T3-T2)]$. The RTT may be used to determine a distance between RSTA 1204 and ISTA 1202. The LMR 1242 may include a channel state information (CSI) element. In accordance with some embodiments, the ISTA 1202 does not acknowledge the receipt of the LMR 1242. The measurement round (e.g., operations 1283 through 1290 or 1292) may be identified by the dialog token 1229 and LTF generation SAC (e.g., SAC 1226) used in the measurement round. The long token field 1228 may include both the dialog token 1229 and the SAC 1226. The long token field 1228 may be used to identify the LMR 1242 to aid in preventing reply attacks or for other uses.

The report 1244 may include an indication that UL NDP 1232 is or likely is counterfeit. The report 1244 may include an error indication 1231 as disclosed in conjunction with LMR 1256. The SAC 1226 may identify the temporary key (e.g., next key 1216) that was used to generate UL NDP 1232 and/or DL NDP 1236. The next SAC 1248 and next key 1250 may be for a next FTM. The long token 1228 may be incremented by one for a next FTM, in accordance with some embodiments. If the long token 1228 is greater than a maximum threshold (e.g., a maximum value that can be represented by the long token 1228), then a new master keys 1220 and master key 1212 may be generated, in accordance with some embodiments. In some embodiments, a same temporary key (e.g., next key 1216, next key 1250, or temp key 1404) is used for each FTM until a threshold is reached for the long token 1228, e.g., the long token 1228 is incremented for each FTM and the same temporary key is used until the long token 1228 reaches a threshold. In some embodiments, a different way of changing the long token 1228 may be used.

For example, for a next FTM, the long token 1228 may be equal to (long token+a value) modulus a value, in accordance with some embodiments. A cycling of the long token 1228 may be used to determine when a new temporary key 1404 and/or master key 1402 is to be generated. In some embodiments, not using a same value of the long token 1228 with a temporary key 1404 and/or master key 1402 prevents a replay attack as disclosed in conjunction with FIGS. 8 and 9.

The LMR 1242 may be encrypted using one or more of a master key 1220, a different master key (e.g., a different master key than is used for LTF generation), a temporary key 1404, a key generated in relation to the TKIP MPDU 1000, and/or a key generated in relation to the CCMP MPDU 1100. In some embodiments, RSTA 1204 will encrypt LMR 1242 in accordance with Protected Management Frames in accordance with IEEE 802.11w and/or one of TKIP or CCMP.

The RSTA 1204 may generate next key 1250 and next SAC 1248 for use with a next FTM. In some embodiments, if the UL NDP 1232 was received in error (or determined to be counterfeit) and/or the DL NDP 1236 was transmitted in error, the LMR 1242 may indicate that an error occurred, e.g., by setting a value of the time of arrival (ToA) field to zero, or a value of a TOA Error field to a maximum value. In some embodiments, the RSTA 1204 may have transmitted the LMR 1242 because a LMR type of reporting may have been set to immediate, e.g., immediate/delayed which may have been set to immediate during set-up 1210.

In some embodiments, the method 1200 may end after operation 1290. In some embodiments, the method 1200 may continue at operation 1291 with the ISTA 1202 waiting a SIFS 1230.4. The method 1200 may continue at operation 1292 with the ISTA 1202 transmitting a LMR 1256 to the RSTA 1204.

The ISTA 1202 may determine the LMR 1256 at operation 1316. The ISA 1202 may generate the LMR 1256 to include a report 1258 (e.g., times T1 1304 and T4 1310, which gives RSTA 1204 enough information to determine a distance between ISTA 1202 and RSTA 1204). The LMR 1256 from the ISTA 1202 may include the SAC 1226, long token 1228, dialog token 1229, and error indication 1231. The report 1244 may include the long token 1228 and the long token 1228 may include the SAC 1226 and the dialog token 1229. The SAC 1226 may indicate the temporary key 1404 and/or long token 1228 used to generate UL NDP 1232. The LMR 1256 may indicate if there was an error in DL NDP 1236 and/or LMR 1242, e.g., if they were received in error or determined to be counterfeit. The LMR 1256 may be encrypted in a same or similar way as LMR 1242. The LMR 1256 may include one or more of next SAC 1248, next key 1250, and/or long token 1228 as disclosed in conjunction with operation 1314. In some embodiments, for indicating which measurement round a measurement report e.g. report 1244 and report 1258 is for, a complete identifier or long token 1228 may be used in the measurement report 1244, 1258. The complete identifier or long token 1228 may consist of the LTF generation SAC (e.g., SAC 1226) generating the NDPs in the measurement round under report and the dialog token 1229 used in the measurement round under report. The dialog token 1229 may be initially issued by the ISTA in the NDPA of the measurement round under report. The ISTA 1202 and/or RSTA 1204 may increment the dialog token 1229 for each FTM round. The dialog token 1229 may be reset when it reaches a maximum value. The changing SAC 1226 in combination with the dialog token 1229 may provide the complete identifier (or long token 1228) for the LMR 1256 or FTM round.

Method 1200 may include one or more additional operation. The operations of method 1200 may be performed in a different order. In some embodiments, one or more operations of method 1200 may be optional.

Figure 17:
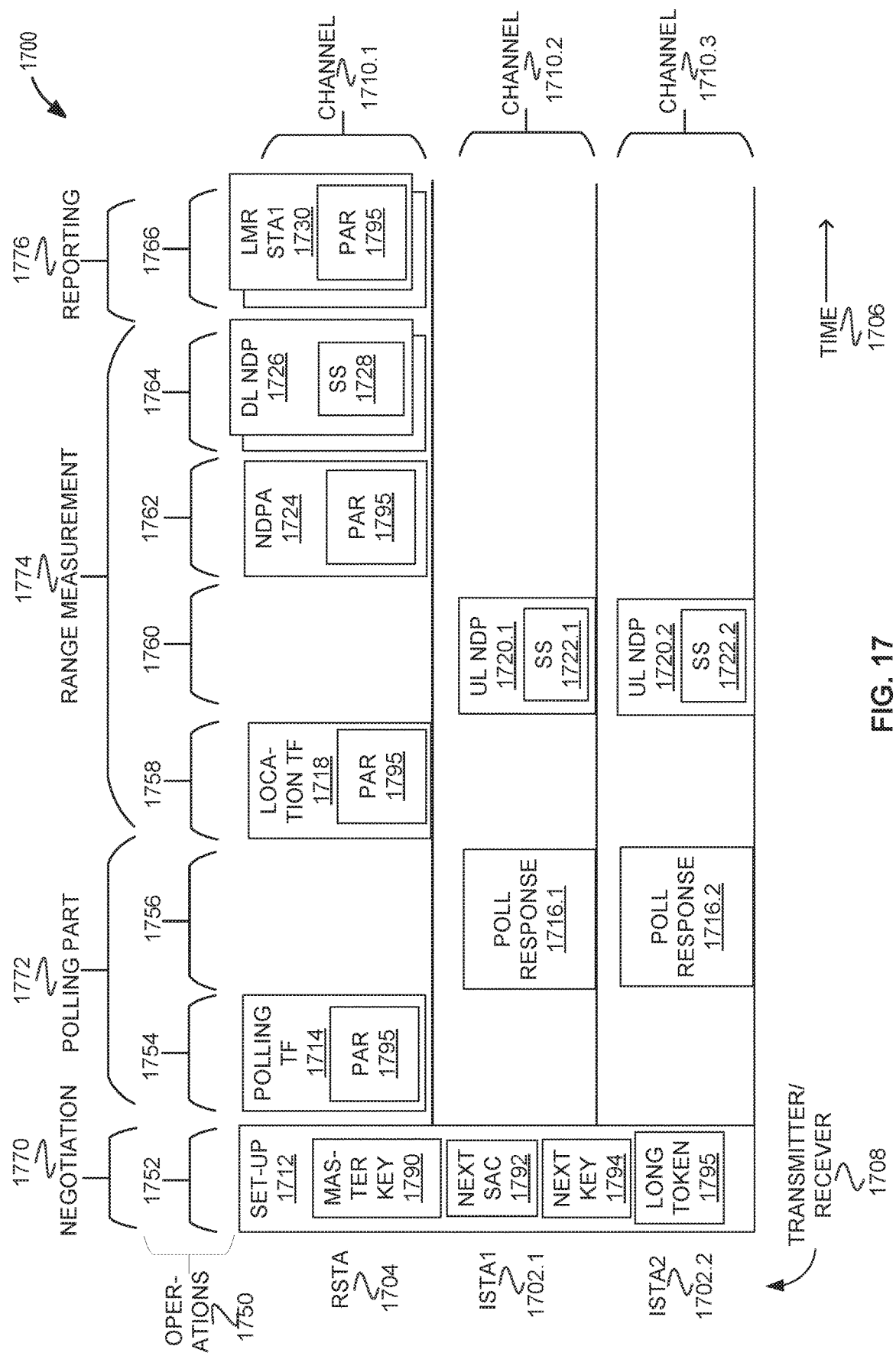
FIG. 17 illustrates a method of authenticating ranging devices, in accordance with some embodiments.
Figure 18:
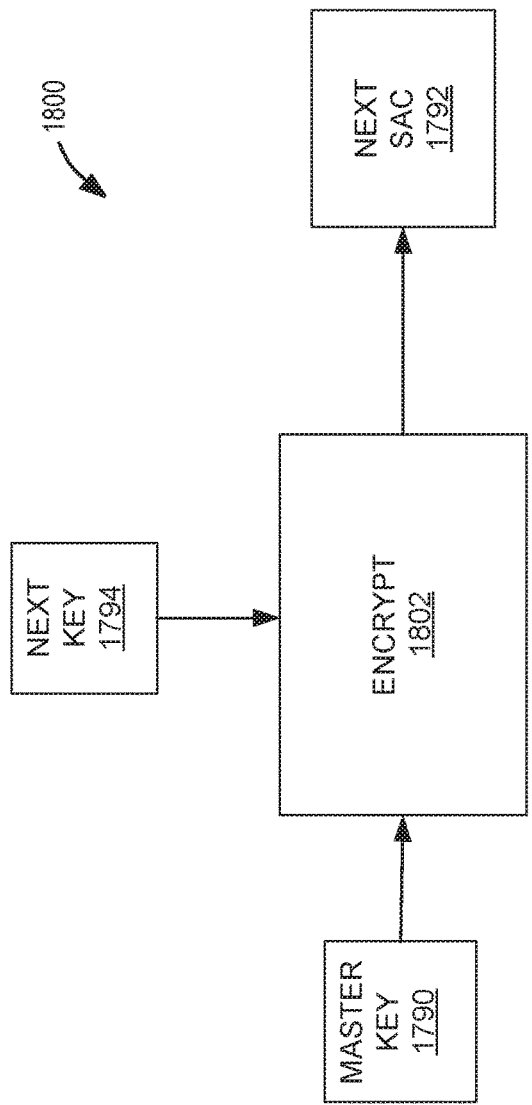
FIG. 18 illustrates generating a next sequence authentication code (SAC) 1692, in accordance with some embodiments.
Figure 19:
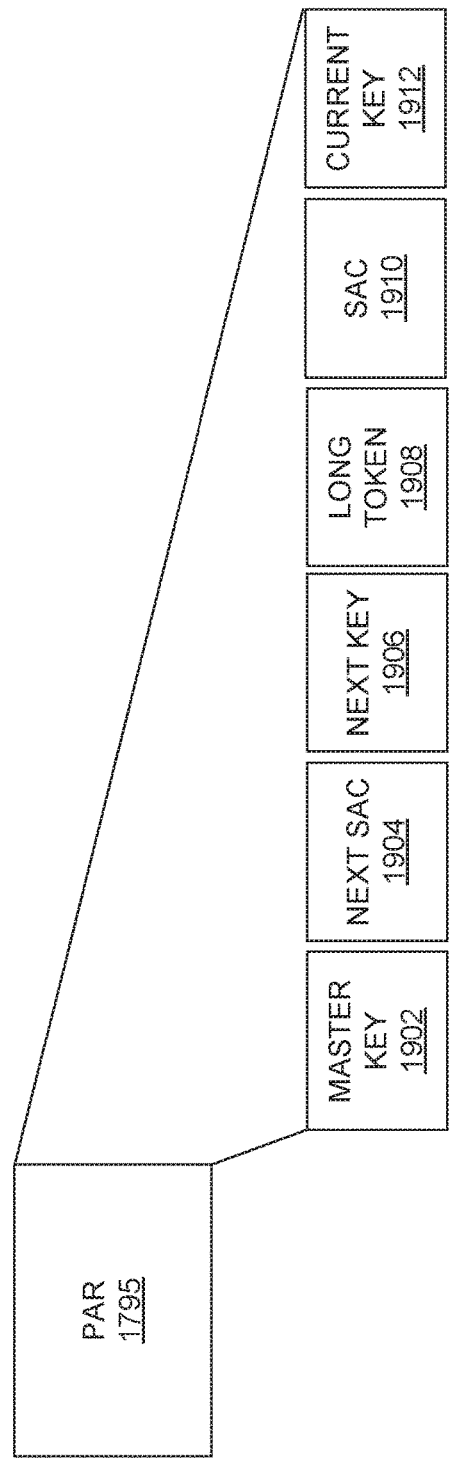
FIG. 19 illustrates parameters, in accordance with some embodiments.

FIGS. 17, 18, and 19 are disclosed in conjunction with one another. FIG. 17 illustrates a method 1700 of authenticating ranging devices, in accordance with some embodiments. Illustrated in FIG. 17 is time 1706 along a horizontal axis, transmitter/receiver 1708, ISTA1 1702.1, ISTA2 1702.2, RSTA 1704, channels 1710, and operations 1750 along the top. The method 1700 may be divided into negotiation 1770, polling part 1772, range measurement 1774, and reporting 1776.

The ISTAs 1702 may be a HE STA 504 or HE AP 502 as described in conjunction with FIG. 5, e.g., ISTA and RSTA may be configured to operate in accordance with IEEE 802.11az. There may be more than two ISTAs 1602. Channel 1710.1, channel 1710.2, and channel 1718.3 may be a sub-band, e.g., 20 MHz, of a bandwidth, e.g., 320 MHz, and may be a number of tones or subcarriers. Channel 1710.1, channel 1710.2, and channel 1710.3 may be the same channel. Channel 1718.1, channel 1718.2, and channel 1718.3 may partially overlap.

The method 1700 begins at operation 1752 with set-up 1712. ISTAs 1702 and RSTA 1704 may perform operations for FTM. The set-up 1712 may include a FTM negotiation. The ISTAs 1702 and RSTA 1704 may derive a master key 1790. In some embodiments, the master key 1790 is the same for the RSTA 1704, ISTA1 1702.1, and ISTA2 1702.2. In some embodiments, RSTA 1704 and ISTAs 1702 derive separate master keys. The master key 1790 may be derived based on a PTKSA, which may be the result of 4-way handshake, FT 4-way handshake, BSS FT protocol, FT resource request protocol, FILS authentication, PASN authentication, or anther protocol. The master key 1790 may be derived from the PTKSA. The master key 1790 may have a limited lifetime. The master key 1790 may be a PTK and/or PMKs. In some embodiments, the master keys 1790 may be GTKs. In some embodiments, the master key 1790 may be more than one key, e.g., a transient key and a less transient key. The master key 1790 may be derived based on a CCMP and/or TKIP procedure.

The set-up 1712 may include the exchange of one or more of: a master key 1790, next SAC 1792, next key 1794, long token 1795, a key associated with TKIP, and/or a key associated with CCMP. In some embodiments, the set-up 1712 may include the exchange of secure LTF parameters element 1500 as disclosed in conjunction with FIG. 15. For example, long token 1795 may be number of LTF sequence 1508, next key 1794 may be temporary key 1510, and next SAC 1792 may be LTF generation SAC 1504 and/or range measurement SAC 1506.

The method 1700 continues at operation 1754 with RSTA 1704 transmitting polling trigger frame (TF) 1714. The RSTA 1704 may wait a SIFS after operation 1752 before transmitting the polling TF 1714 or may wait a longer duration. The polling TF 1714 may poll one or more of the ISTAs 1702 to determine which ISTAs 1702 would like to perform a ranging measurement 1774. The polling TF 1714 may include par 1795. FIG. 19 illustrates parameters (par) 1795, in accordance with some embodiments. Illustrated in FIG. 19 is par 1795, which may include master key 1902, next SAC 1904, next key 1906, long token 1908, SAC 1910, and/or current key 1912. The master key 1902 may be master key 1790 or another master key. Next SAC 1904 may be an indicator of next key 1906. In some embodiments, next SAC 1904 may be generated as described in conjunction with FIG. 18. Next key 1906 may be a next temporary key. Long token 1908 may be a sequence number indicating a sequence of the FTM (which may include one or more of negotiation 1770, polling part 1772, range measurement 1774, and/or reporting 1776). SAC 1910 may be an indicator for a current key 1912 (e.g., next key 1794 may be the current key 1912 for par 1795). The SACs, e.g., next SAC 1904 and SAC 1910, may be used to indicate the next key 1906 and current key 1912, respectively. The SAC may be used because they require fewer bits to represent than the full key (e.g., next key 1906 and current key 1912), which may be 48 bits or more.

The par 1795 may indicate parameters for encryption that the ISTAs 1702 should use for the UL NDP 1720 as well as parameters for encryption that the RSTA 1704 will use for location TF 1718, NDPA 1724, DL NDP 1726, and/or LMR STA1 1739. In some embodiments. RSTA 1704 will encrypt polling TF 1714 in accordance with Protected Management Frames in accordance with IEEE 802.11w.

FIG. 18 illustrates generating a next sequence authentication code (SAC) 1692, in accordance with some embodiments. Illustrated in FIG. 18 is master key 1790, next key 1794, encrypt 1802, and next SAC 1792. The RSTA 1704 may encrypt 1802 the next key 1794 with the master key 1790 to generate the next SAC 1792. The next SAC 1792 may be used as an identifier for the next key 1794. In some embodiments, the encryption of the next key 1794 may be truncated or another arithmetic action performed to reduce the size of the next SAC 1792, e.g., so the field to represent the next SAC 1792 may be smaller.

Returning to FIG. 17, the method 1700 continues at operation 1756 with the ISTAs 1702 transmitting poll responses 1716. In some embodiments, the ISTAs 1702 will first check the validity of par 1795 (when par 1795 is included in the polling TF 1714). And if the authentication fails (e.g., if the ISTAs 1702 determine that par 1795 is not valid), then ISTAs 1702 will not transmit the poll response 1716, in accordance with some embodiments.

The ISTAs 1702 may check to see if the par 1795 is valid. For example, if par 1795 includes next SAC 1792, then ISTAs 1702 may use the master key 1790 to encrypt next key 1794 (as illustrated in FIG. 18) and see if the result is equivalent to next SAC 1792 as disclosed in conjunction with FIG. 18.

The method 1700 may continue at operation 1758 with the RSTA 1704 transmitting location TF 1718. The RSTA 1704 may determine which ISTAs 1702 responded to the polling TF 1714 and include them in the location TF 1718. Location TF 1718 may include par 1795. The location TF 1718 may include spatial stream (SS) resource allocations for the ISTAs 1702 so that they may transmit simultaneously. In some embodiments, the ISTAs 1702 will transmit sequentially which may be triggered by one or more location TFs 1718. In some embodiments, RSTA 1704 will encrypt location TF 1718 in accordance with Protected Management Frames in accordance with IEEE 802.11w. In some embodiments, location TF 1718 includes an authentication field such as next SAC 1792, which may be used to authenticate location TF 1718 as disclosed in conjunction with FIG. 18.

The method 1700 continues at operation 1760 with the ISTAs 1702 transmitting UL NDPs 1720 in accordance with SS 1722. The ISTAs 1702 may check the validity of par 1795 and not transmit if the par 1795 is not found to be valid. The UL NDP 1720 may be generated using master key 1790, current key 1912, and long token 1795 to generate LTF sequences 1410, as disclosed in conjunction with FIG. 14. The next key 1794 may become the current key 1912 for this round of FTM. The next SAC 1792 may become the SAC 1910 for this round of FTM.

The method 1700 continues at operation 1762 with RSTA 1704 transmitting NDPA 1724. The NDPA 1724 may include par 1795. The ISTAs 1702 may check the validity of par 1795 and not use the results of LMR STA1 1730 or not process DL NDP 1726 if the par 1795 is not found to be valid. The method 1700 continues at operation 1764 with RSTA 1704 transmitting DL NDP 1726 in accordance with the SS 1728. In some embodiments, a single DL NDP 1726 is transmitted on the channel 1710. The DL NDP 1726 may be generated using the master key 1790, current key 1794, and/or long token 1795 as disclosed in conjunction with FIG. 14.

The method continues at operation 1766 with the RSTA 1704 transmitting LMR STA1 1730. RSTA 1674 may transmit one LMR for each ISTA 1702. The LMR STA 1 1730 may be transmitted on a SS in accordance with a schedule that may be part of the LMR STA1 1730. The LMR STA1 1730 may include par 1795. The ISTAs 1702 may check the validity of par 1795 and may determine not to use the results of LMR STA 1 1730 or process DL NDP 1726 if the par 1795 is not found to be valid. The LMR STAs 1730 may be transmitted in TKIP MPDU 1000 or CCMP MPDU 1100, in accordance with some embodiments.

Additionally, in operation 1766 (or operation 1754, 1758, or 1762) new parameters 1795 are generated for a next FTM. For example, the next SAC 1792 may be SCA 1910 for operations 1754 through 1766. Next key 1794 may be current key 1912 for operations 1754 through 1766. For example, at LMR STA1 1730, the RSTA 1704 may determine new parameters 1795 for a next FTM. In some embodiments, the RSTA 1704 will increment long token 1908 for a next FTM. If the long token 1908 exceeds a threshold value, then the RSTA 1704 may generate a new next key 1906 and new next SAC 1904 and reset the value of the long token 1908. By not reusing the same long token 1908 and SAC 1910 (or current key), the RSTA 1704 may prevent replay attacks as described in conjunction with FIGS. 9 and 10.

In some embodiments, the new parameters 1795 may be transmitted in a secure LTF parameter element 1500. For example, the number of LTF sequence 1508 may be the long token 1908, the temporary key 1510 may be the next key 1906 (or the current key 1912), the LTF generation SAC 1504 may be the range measurement SAC 1506 may be SAC 1910 (i.e., the SAC 1910 that indicates the current key 1912 that is used in the generation of UL NDPs 1720 and DL NDPs 1726.) LTF generation SAC 1504 may be the SAC that indicates the next SAC 1904 or temporary key 1510. In some embodiments, the new parameters 1795 may only be a new value for long token 1908.

The method 1700 may optionally include the ISTAs 1702 transmit LMRs to the RSTA. The par 1795 may protect the ISTAs 1702 from transmitting the UL NDP 1720, which may provide information that may help a RSTA 1704 transmitting a counterfeit location TF 1718 determine a master key 1790 or next SAC 1792.

The time between the operation of method 1700 may be a SIFS. Method 1700 may include one or more additional operation. The operations of method 1700 may be performed in a different order. In some embodiments, one or more operations of method 1700 may be optional.

In some embodiments, the parameters 1795 may include a portion of the long token 1908. For example, only the last 15 bits or less. In some embodiments, the par 1795 are only included with the LMR STAs 1730. In some embodiments, only a portion of the long token 1908 is included in the par 1795. In some embodiments, reference to the long token 1908 may include a portion that is the IV/KEY ID 1004 or IV KEY ID 1114 (and/or Ext IV 1116).

Figure 20:
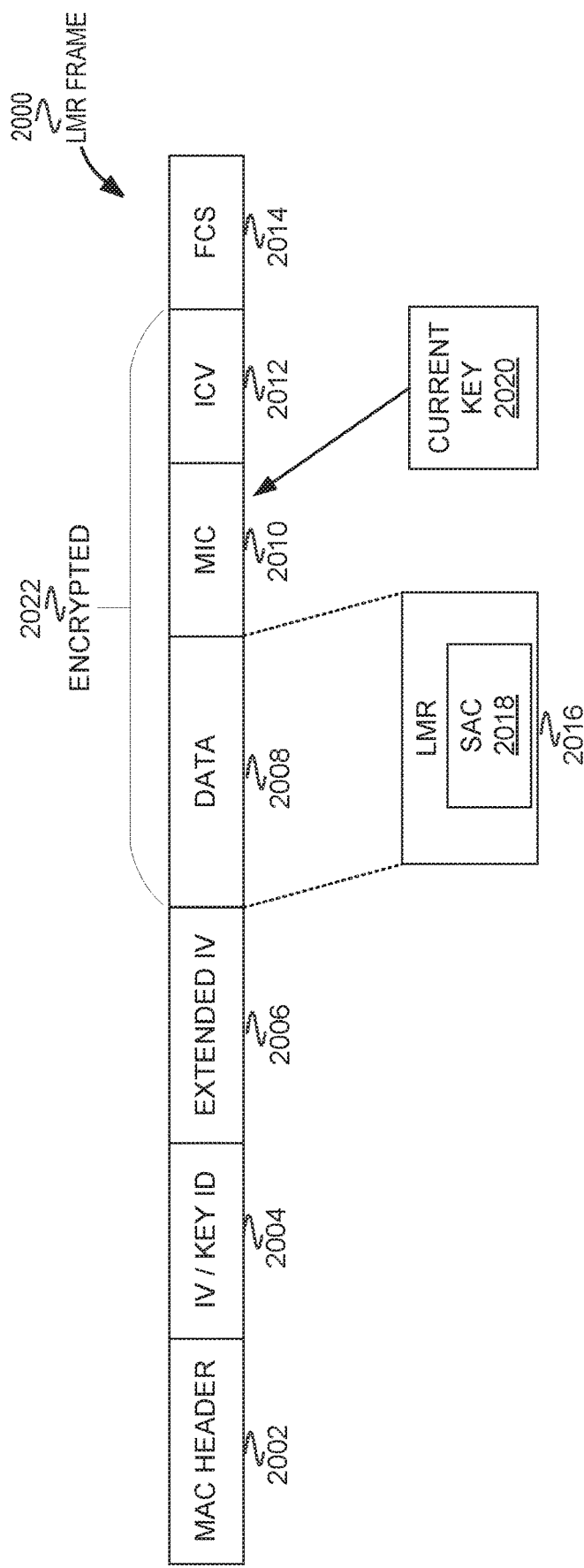
FIG. 20 illustrates a location measurement report (LMR) frame encrypted using TKIP, in accordance with some embodiments.

FIG. 20 illustrates a location measurement report (LMR) frame 2000 encrypted using TKIP, in accordance with some embodiments. Illustrated in FIG. 20 is MAC header 2002, IV/KEY ID 2004, extended IV 2006, data 2008, MIC 2010, ICV 2012, FCS 2014, LMR 2016, SAC 2018, current key 2020, and encrypted 2022. The fields may be the same or similar as the fields as disclosed in conjunction with FIG. 10 where TKIP encryption is used. In some embodiments, the LMR (e.g., 1242, 1256, 1730) may include a SAC 2018, e.g., SAC 1226 or SAC 1910, range measurement SAC 1506, or SAC 1406. The MIC 2010 may be determined using the key that is referred to by the SAC, e.g., next SAC 1792, temp key 1404, or next key 1216.

The MIC 2010 may be determined as if the current key 2020 was included in the LMR 2016. The ICV 2012 and FCS 2014 may be determined either as if the current key 2020 was included in the LMR 2016 or as if the current key 2020 was not included in the LRM 2016. The current key 2020 is not included in the LMR 2016 nor is it transmitted with the LMR frame 2000.

To decrypt or authenticate the LMR frame 2000 the receiver (RSTA or ISTA) may then retrieve the current key 2020 that is indicated by the SAC 2018 and determine the MIC 2010 as if the current key 2020 were included in the LMR 2016. The current key 2020 is sent in a previous frame, referring to FIG. 12, set-up 1210, NDPA 1224, or a frame from a previous FTM (e.g., the LMR from the previous FTM), or referring to FIG. 17 set-up 1712, polling TF 1714, location TF 1718, NDPA 1724, or in a frame from a previous FTM. The LMR frame 2000 may include a next key and next SAC for a next round of FTM.

Not including the current key 2020 may reduce the size of the LMR 2016 and increase efficiency. Additionally, not including the current key 2020 may make the transmission of the LMR frame 2000 more secure as both the transmitter and receiver will have to have a stored version of the current key 2020 to authenticate the MIC 2010.

Figure 21:
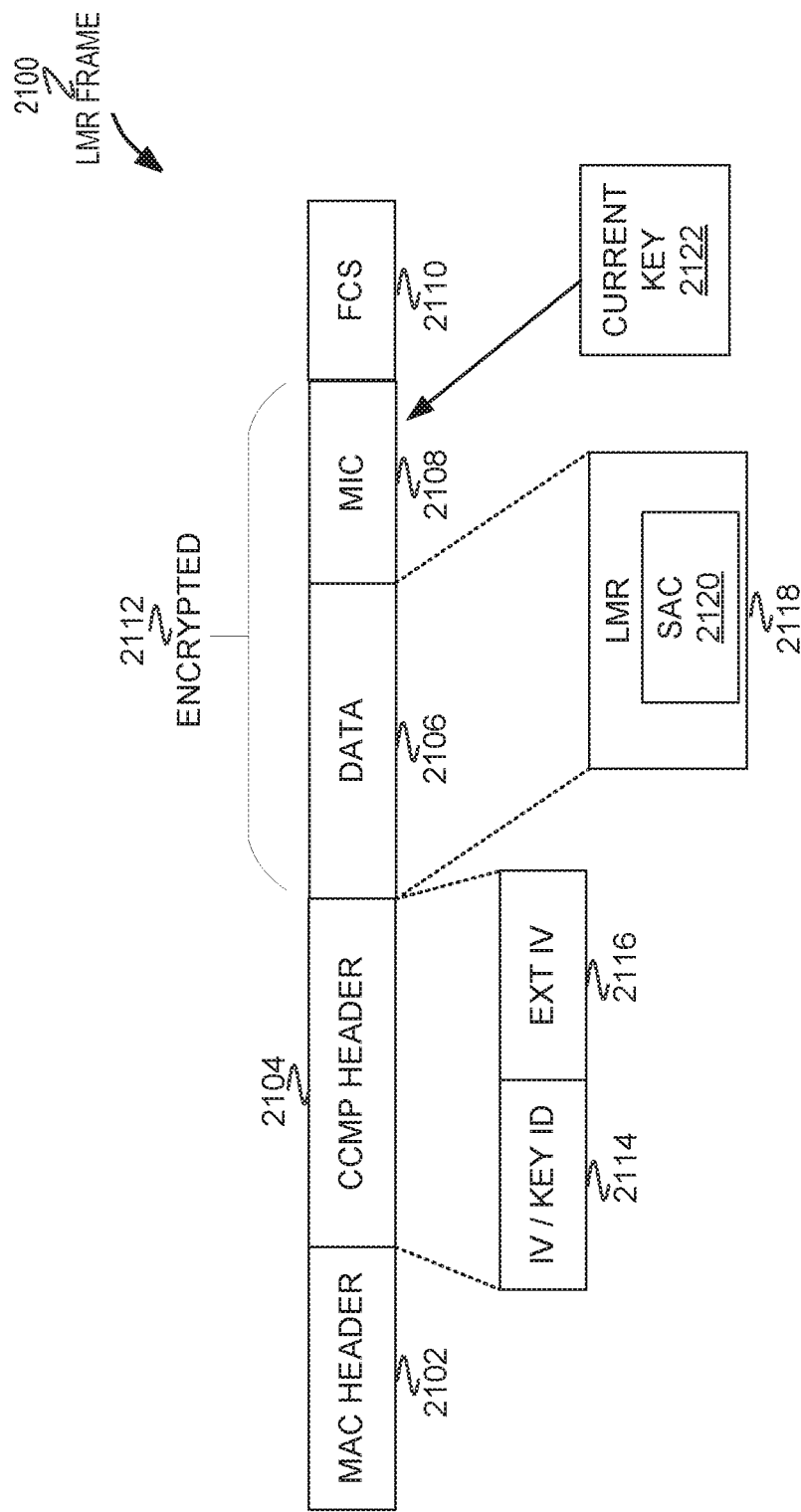
FIG. 21 illustrates a LMR frame encrypted using CCMP, in accordance with some embodiments.

FIG. 21 illustrates a LMR frame 2100 encrypted using CCMP, in accordance with some embodiments. Illustrated in FIG. 21 is MAC header 2102, CCMP header 2104, IV/KEY ID 2114, extended IV 2116, data 2106, MIC 2108, FCS 2110, LMR 2118, SAC 2120, current key 2222, and encrypted 2112. The fields may be the same or similar as the fields as disclosed in conjunction with FIG. 11 where CCMP encryption is used with the following modification. In some embodiments, the LMR (e.g., 1242, 1256, 1730) may include a SAC 2120, e.g., SAC 1226 or SAC 1910, range measurement SAC 1506, or SAC 1406. The MIC 2108 may be determined using the key that is referred to by the SAC, e.g., next SAC 1792, temp key 1404, or next key 1216.

The MIC 2108 may be determined as if the current key 2122 was included in the LMR 2118. FCS 2110 may be determined either as if the current key 2122 was included in the LMR 2118 or as if the current key 2122 was not included in the LRM 2118. The current key 2122 is not included in the LMR 2118 nor is it transmitted with the LMR frame 2100.

To decrypt or authenticate the LMR frame 2100 the receiver (RSTA or ISTA) may then retrieve the current key 2122 that is indicated by the SAC 2120 and determine the MIC 2108 as if the current key 2122 were included in the LMR 2118. The current key 2122 is sent in a previous frame, referring to FIG. 12, set-up 1210, NDPA 1224, or a frame from a previous FTM (e.g., the LMR from the previous FTM), or referring to FIG. 17 set-up 1712, polling TF 1714, location TF 1718, NDPA 1724, or in a frame from a previous FTM. The LMR frame 2100 may include a next key and next SAC for a next round of FTM.

Not including the current key 2122 may reduce the size of the LMR 2118 and increase efficiency. Additionally, not including the current key 2122 may make the transmission of the LMR frame 2100 more secure as both the transmitter and receiver will have to have a stored version of the current key 2122 to authenticate the MIC 2108.

Figure 22:
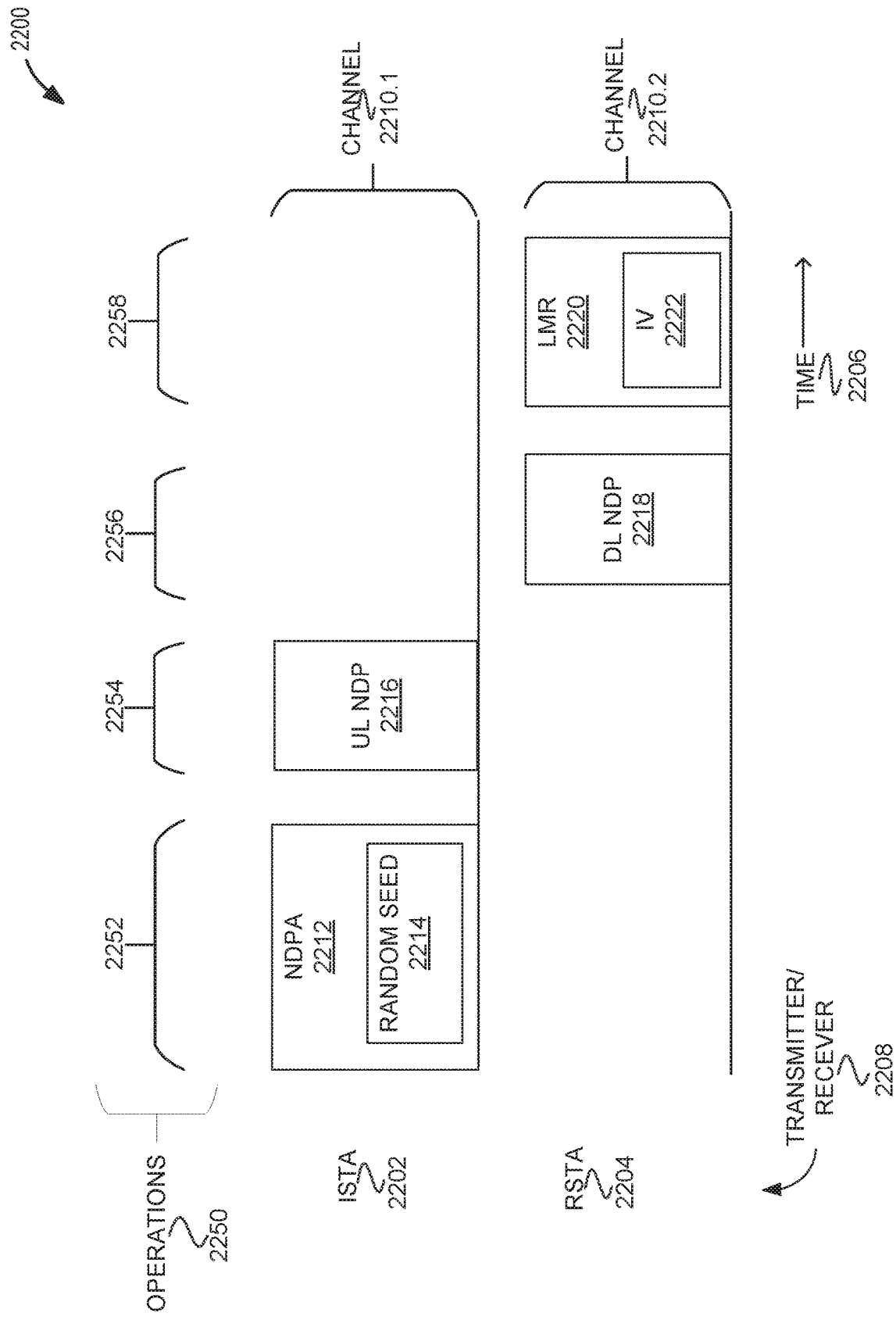
FIG. 22 illustrates a method for authenticating ranging devices, in accordance with some embodiments.

FIG. 22 illustrates a method 2200 for authenticating ranging devices, in accordance with some embodiments. Illustrated in FIG. 22 is time 2206 along a horizontal axis, transmitter/receiver 2208, ISTA 2202, RSTA 2204, channels 2210, and operations 2250 along the top. The ISTA 2202 may be a HE STA 504 or HE AP 502 as described in conjunction with FIG. 5, e.g., ISTA 2202 and RSTA 2204 may be configured to operate in accordance with IEEE 802.11az. Channel 2210.1 and channel 2210.2 may be a sub-band, e.g., 20 MHz, of a bandwidth, e.g., 320 MHz, and may be a number of tones or subcarriers. Channel 2210.1 and channel 2210.2 may be the same channel. For illustration convenience, channel 2210.1 and channel 2210.2 are illustrated with different sizes, but channel 2210.1 and channel 2210.2 may be the same bandwidth and may be the same channel. Channel 2210.1 and channel 2210.2 may partially overlap.

In some embodiments, some information (for the generation of encrypted information such as information for the generation randomized LTF sequence 1408) is needed to be used to protect the LMR (e.g., LMR 2220, LMR STA1 2332 and LMR STA2, LMR STA1 2432, LMR STA2 2436). Example frames are referenced to FIGS. 22-24, but the disclosure may apply to the other examples provided herein. A protective chain may cover initiating frames (NDPA 2212, location TF 2312, location TF 2318, NDPA 2322, polling TF 2412, location TF 2418, location TF 2422, NDPA 2422) corresponding NDP sounding frames (UL NDP 2216, DL NDP 2218, UL NDP 2316, UL NDP 2316, DL NDP STA1 2326, DL NDP STA2 2328, UL NDP 2410.1, UL NDP 2420.2, DL NDP STA1 2426, DL NDP STA2 2428) and the consequent LMR (LMR 2220, LMR STA1 2332, LMR STA2 2336, LMR STA1 2432, and LMR STA2 2436) against any forgery, alteration, or reply. In some embodiments, e.g., the random seed (e.g., one or more of master key 1402, long token 1228, and/or temp key 1404) may be partially sent (e.g., FIG. 20) or random seed may be unsent (e.g., FIG. 21).

In some embodiments, a MIC field and IV field is present in the LMR frame (e.g., TKIP MPDU 1000 or CCMP MPDU 1100). In some embodiments, the IV field (e.g., 1004, 1006, 1114, 1116) for encrypting the LMR is used to carry a random seed or measurement token. Using bits in the IV field may reduce the bits needed in the LMR. The IV field contains 3, 6, or 7 usable bits, in accordance with some embodiments.

Returning to method 2200, the method 2200 may include a set-up, e.g., a set-up the same or similar as set-up 1210. The method 2200 may include (not illustrated) the ISTA 2202 contending for and acquiring the wireless medium (e.g., channel 2210.1). The method 2200 may continue at operation 2252 with the ISTA 2202 transmitting a NDPA 2212. The NDPA 2212 may include one or more random seeds 2214 (e.g., one or more of master key 1402, long token 1228, and/or temp key 1404) for generating UL NDP 2216 and DL NDP 2218. In some embodiments, the random seeds 2214 may be a portion of the IV field (e.g., 1004, 1006, 1114, 1116) used for the encryption method (e.g., TKIP or CCMP) to encrypt the NDPA 2212.

The ISTA 2202 (operation 2254) may use the random seed 2214 and another key derived (e.g., master key 1402) during a set-up to generate UL NDP 2216 (e.g., see FIG. 14). The RSTA 2204 (operation 2256) may use the random seed 2214 and another key derived (e.g., master key 1402) during a set-up to generate UL NDP 2216 (e.g., see FIG. 14).

In some embodiments, RSTA 2204 may use IV 2222 to generate UL NDP 2216 (e.g., see FIG. 14) with another key (e.g., master key 1402). In some embodiments, to help prevent replay attacks, the random seed 2214 and/or another key (e.g., master key 1402, long token 1228, or temp key 1404) used to generate UL NDP 2216 and DL NDP 2218 (e.g., see FIG. 14) may be used for a part or a whole of the IV field (e.g., 1004, 1006, 1114, 1116) for encrypting the LMR 2220, e.g., with PKIP (FIG. 10) or CCMP (FIG. 11).

In some embodiments, the RSTA 2204 (operation 2258) may transform the random seed 2214 and/or key (e.g., master key 1402, long token 1228, or temp key 1404) partially or wholly for the IV field, e.g., a bit order flip, 0 to 1 exchange, or another transformation. For example, random seed 2214 value of may be transformed to 0100110 as a part of or the IV field (e.g., 1004, 1006, 1114, 1116) for encrypting the LMR 2220, e.g., with PKIP (FIG. 10) or CCMP (FIG. 11). Different transformations or conversions may be used. In some embodiments, the random seed 2214 may be used to generate a series of pseudo random numbers and then the pseudo random numbers may be used as the IV field (e.g., 1004, 1006, 1114, 1116) for encrypting the LMR 2220, e.g., with PKIP (FIG. 10) or CCMP (FIG. 11). An attacker may be able to decrypt the LMR 2220, but it may be difficult to change and encrypt the LMR 2220 for an attacker. The NDPA 2212 may include may include a counting token (e.g., long token 1228).

The time between the operation of method 2200 may be a SIFS. Method 2200 may include one or more additional operation. The operations of method 2200 may be performed in a different order. In some embodiments, one or more operations of method 2200 may be optional.

Figure 23:
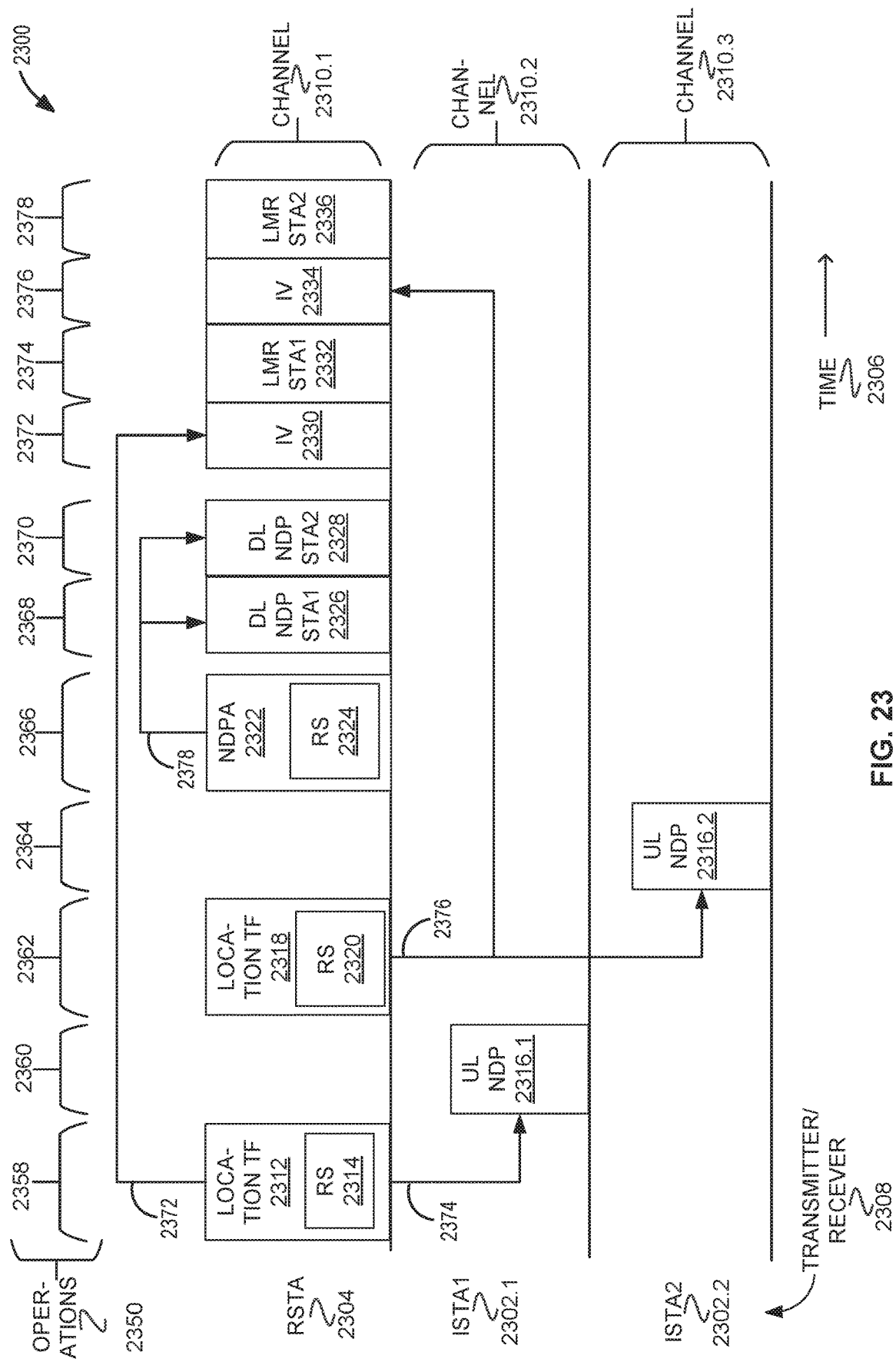
FIG. 23 illustrates a method for authenticating ranging devices, in accordance with some embodiments.

FIG. 23 illustrates a method 2300 for authenticating ranging devices, in accordance with some embodiments. Illustrated in FIG. 23 is time 2306 along a horizontal axis, transmitter/receiver 2308, ISTA1 2302.1, ISTA2 2302.2, RSTA 2304, channels 2310, and operations 2350 along the top.

The ISTAs 2302 may be a HE STA 504 or HE AP 502 as described in conjunction with FIG. 5, e.g., ISTA and RSTA may be configured to operate in accordance with IEEE 802.11az. There may be more than two ISTAs 2302. Channel 2310.1, channel 2310.2, and channel 2318.3 may be a sub-band, e.g., 20 MHz, of a bandwidth, e.g., 320 MHz, and may be a number of tones or subcarriers. Channel 2310.1, channel 2310.2, and channel 2310.3 may be the same channel. Channel 2318.1, channel 2318.2, and channel 2318.3 may partially overlap.

Location TF 2312 and/or location TF 2318 may include random seeds 2314, 2320. The random seeds 2314, 2320 may be used for the generation of UL NDP 2316.1 and UL NDP 2316.2, respectively. In some embodiments, the RS 2314 and 2320 may be the same. In some embodiments, the RS 2314 and 2320 may be from an IV field (e.g., 1004, 1006, 1114, 1116) used in encrypting the location TF 2312 and/or location TF 2318. The RSTA 2302 may generate (operations 2358, 2360) location TF 2312 and location TF 2318.

ISTA1 2302.1 (operation 2360) may use (e.g., 2374) the random seed 2314 and another key derived (e.g., master key 1402) during a set-up to generate UL NDP 2316.1 (e.g., see FIG. 14). ISTA1 2302.2 (operation 2364) may use (e.g., 2376) the random seed 2320 and another key derived (e.g., master key 1402) during a set-up to generate UL NDP 2316.2 (e.g., see FIG. 14). In some embodiments, RSTA 2304 may (operation 2368) use RS 2314 to generate DL NDP STA1 2326. In some embodiments, RSTA 2304 may (operation 2370) use RS 2320 to generate DL NDP STA1 2328. One or both of RS 2314, 2320 may be used to generate all or a portion of IV 2334, IV 2330.

In some embodiments, RSTA 2304 may generate (operation 2366) NDPA 2322 to include RS 2324. RS 2324 may be used to generate (operations 2368, 2370, 2372, 2374, 2376, 2378) one or more of DL NDP STA1 2326, DL NDP STA2

2328, IV 2330, and/or IV 2334. IV 2330 and IV 2334 indicate the IV fields used to generate LMR STA1 2332 and LMR STA2 2336, respectively. The IV fields 2334, 2330 may be transformed or derived using the one or more of the RSs 2314, 2322, 2324, e.g., the RSs could be XOR'ed and then converted by a transformation such as flipping 1's to 0's or another operation.

One or more of location TF 2312, location TF 2318, NDPA 2322, LMR STA1 2332, and/or LMR STA2 2336 may include a counting token (e.g., long token 1228). The time between the operation of method 2300 may be a SIFS. Method 2300 may include one or more additional operation. The operations of method 2300 may be performed in a different order. In some embodiments, one or more operations of method 2300 may be optional.

Figure 24:
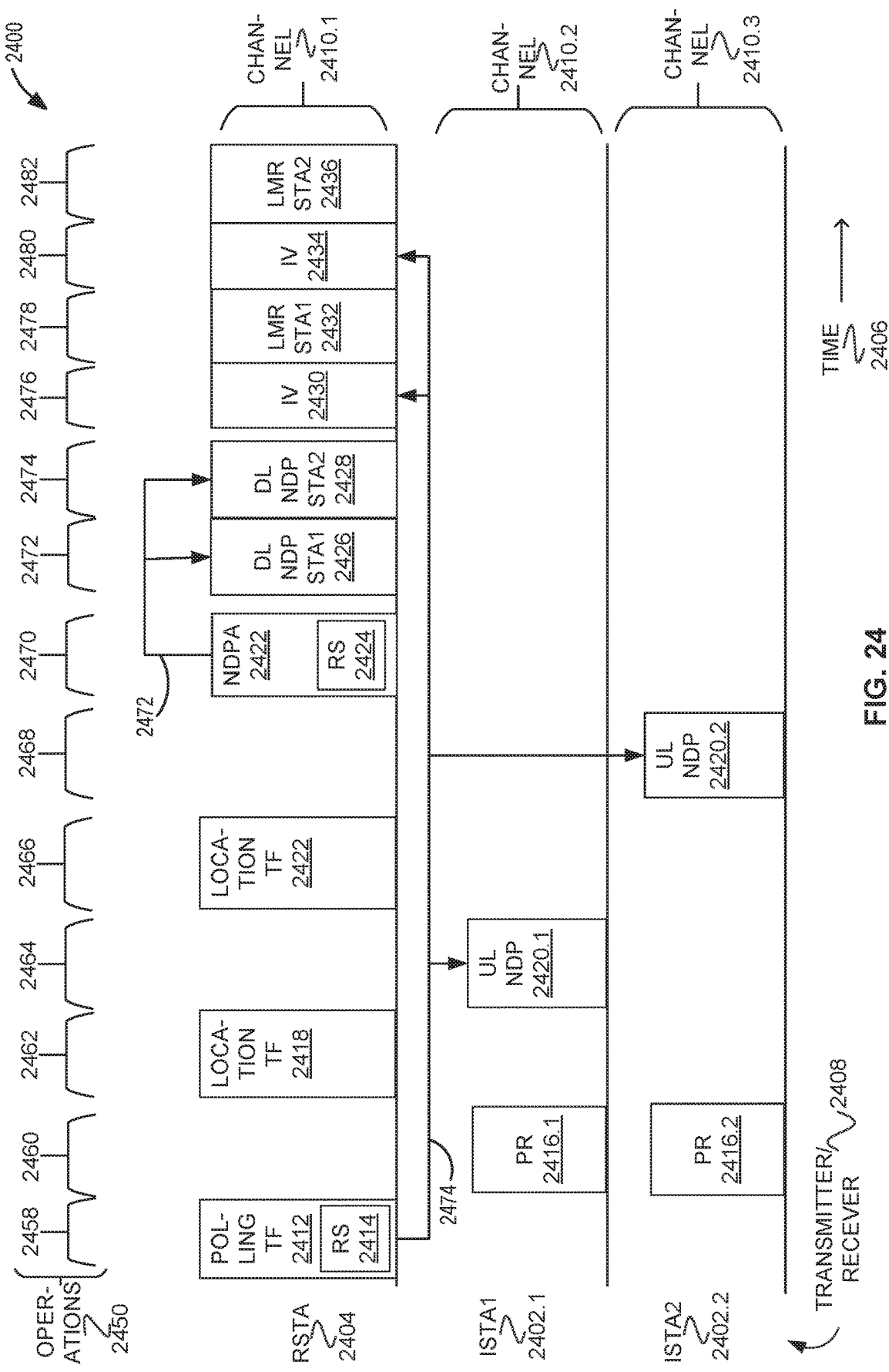
FIG. 24 illustrates a method for authenticating ranging devices, in accordance with some embodiments.

FIG. 24 illustrates a method 2400 for authenticating ranging devices, in accordance with some embodiments. Illustrated in FIG. 24 is time 2406 along a horizontal axis, transmitter/receiver 2408, ISTA1 2402.1, ISTA2 2402.2, RSTA 2404, channels 2410, and operations 2450 along the top.

The ISTAs 2402 may be a HE STA 504 or HE AP 502 as described in conjunction with FIG. 5, e.g., ISTA and RSTA may be configured to operate in accordance with IEEE 802.11az. There may be more than two ISTAs 2402. Channel 2410.1, channel 2410.2, and channel 2418.3 may be a sub-band, e.g., 20 MHz, of a bandwidth, e.g., 320 MHz, and may be a number of tones or subcarriers. Channel 2410.1, channel 2410.2, and channel 2410.3 may be the same channel. Channel 2418.1, channel 2418.2, and channel 2418.3 may partially overlap.

RSTA 2404 may generate (operation 2458) polling TF 2412. Polling TF 2412 may include random seeds 2414. The random seed 2414 may be used (2474) for the generation of one or more of UL NDP 2420.1, UL NDP 2420.2, NDPA 2422, DL NDP STA1 2426, DL NDP STA2 2428, IV 2430, and/or IV 2434. In some embodiments, the RS 2414 may be from an IV field (e.g., 1004, 1006, 1114, 1116) used in encrypting the polling TF 2412. Polling TF 2412 may be the same or similar to polling TF 1714.

ISTA1 2402.1 may generate (operation 2460) and transmit PR 2416.1, which may be the same or similar as poll response 1716.1. ISTA1 2402.2 may generate (operation 2460) and transmit PR 2416.2, which may be the same or similar as poll response 1716.2. The RSTA 2402 may generate (operations 2462, 2466) location TF 2418 and location TF 2422. ISTA1 2402.1 may respond (operation 2464) with UL NDP 2420.1 and ISTA2 2402.2 may respond (2468) with UL NDP 2420.2.

The RSTA 2404 may generate (operation 2470) and transmit NDPA 2422 with random seed 2424. The random seed 2424 may be used (2472) for the generation of one or more of UL NDP 2420.1, UL NDP 2420.2, NDPA 2422, DL NDP STA1 2426, DL NDP STA2 2428, IV 2430, and/or IV 2434. In some embodiments, the RS 2424 may be from an IV field (e.g., 1004, 1006, 1114, 1116) used in encrypting the NDPA 2422. NDPA 2422 may be the same or similar as polling NDPA 1724.

The RSTA 2404 may generate (operations 2472, 2474) and transmit DL NDP STA1 2426 and DL NDP STA2 2428. DL NDP STA1 2426 may the same or similar as DL NDP 1726. DL NDP STA2 2428 may be the same or similar as DL NDP 1726. The RSTA 2404 may generate (operations 2476, 2478, 2480, 2482) and transmit IV 2430, LMR STA1 2432, IV 2434, and LMR STA2 2436. LMR STA1 2432 and LMR STA2 2436 may be the same or similar as LMR STA1 1730.

One or more of polling TF 2412, location TF 2418, location TF 2322, NDPA 2422, LMR STA1 2432, and/or LMR STA2 2436 may include a counting token (e.g., long token 1228).

The time between the operation of method 2400 may be a SIFS. Method 2400 may include one or more additional operation. The operations of method 2400 may be performed in a different order. In some embodiments, one or more operations of method 2400 may be optional.

In some embodiments, the random seed and/or current measurement may be assigned in a previous polling or measurement phase. In this case, the encryption parameters for the LMR such as IV and MIC should be derived from the corresponding random seed (or key) and/or measurement token whose derived sounding signals were measured to generate the LMR. The IV field disclosed herein may be denoted by another name, e.g., initialization vector and packet number for different encryption methods, in accordance with some embodiments.

Figure 25:
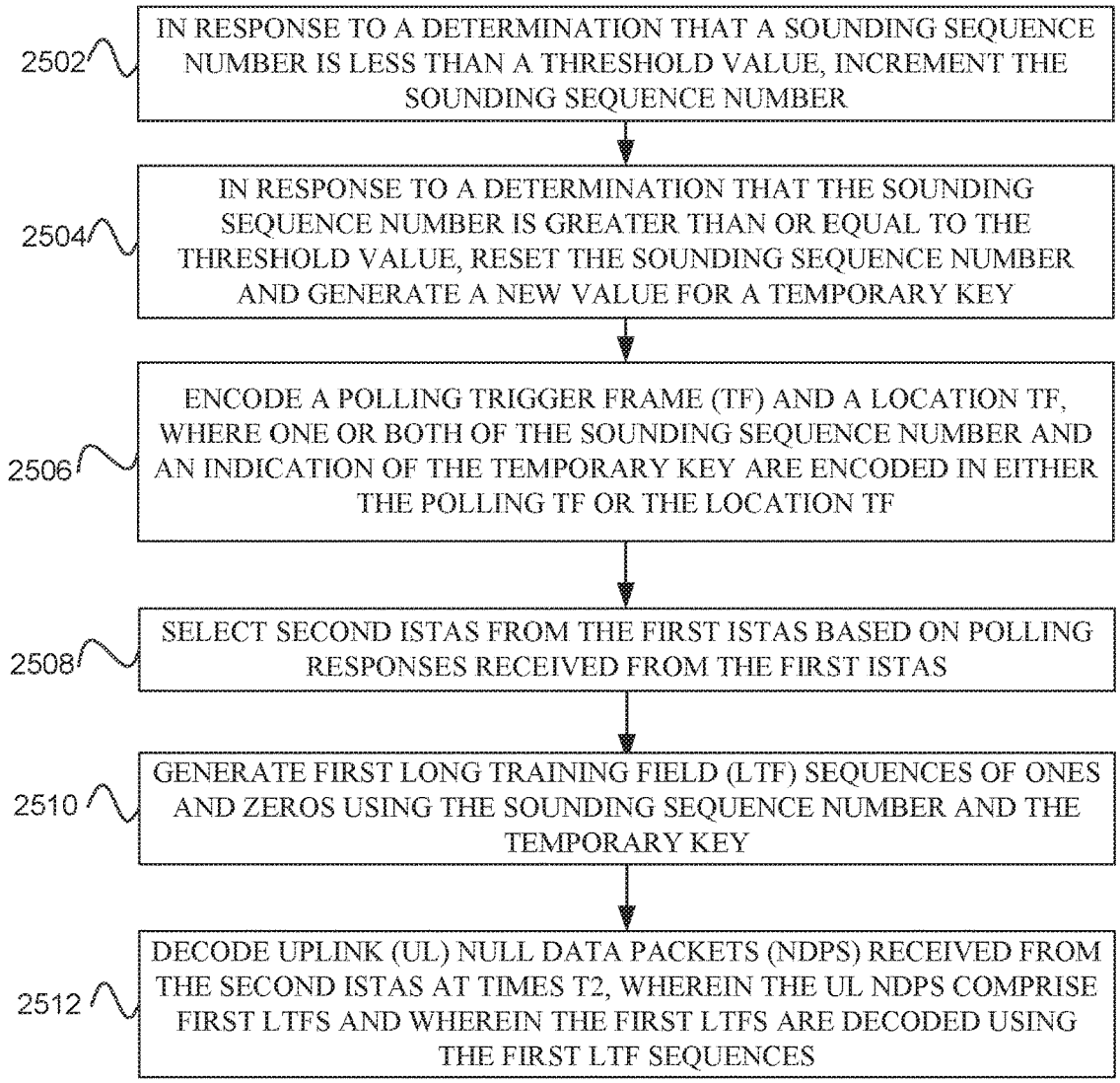
FIG. 25 illustrates a method for authenticating ranging devices, in accordance with some embodiments.

FIG. 25 illustrates a method 2500 for authenticating ranging devices, in accordance with some embodiments. The method 2500 may begin at operation 2502 with in response to a determination that a sounding sequence number is less than a threshold value, incrementing the sounding sequence number. The method 2506 may continue at operation 2504 with in response to a determination that the sounding sequence number is greater than or equal to the threshold value, resetting the sounding sequence number and generate a new value for a temporary key. Operations 2502 and 2504 will be disclosed in conjunction with one another. In some embodiments, RSTA 1704 may determine whether a value indicated by the long token field 1908 is greater than or equal to a threshold. RSTA 1704 may increment the long token 1908 if the value of the long token 1908 is not greater than a threshold (e.g., the threshold may be the maximum value that the long token field 1908 may represent). The RSTA 1704 may if the value of the long token field 1908 is greater than or equal to a threshold, reset the long token field 1908 (e.g., to zero) and generate a new current key 1912 or next key 1906. The operations 2502-2506 may be performed in conjunction with operation 1752, 1754, 1756, 1758, 1760, 1762, 1764, and/or 1766, in accordance with some embodiments.

The method 2500 may continue at operation 2506 with encoding a polling TF and a location TF, where one or both of the sounding sequence number and an indication of the temporary key are encoded in either polling TF or the location TF. For example, the RSTA 1704 may encode the polling TF 1714 and/or the location TF 1718 to include one or both of long token 1908, next SAC 1904, and SAC 1910.

The method 2500 may continue (not illustrated) with configuring the RSTA to transmit the polling TF to first ISTAs. For example, an apparatus of RSTA 1704 may configure the RSTA 1704 to transmit polling TF 1714 to ISTA1 1702.1 and ISTA2 1702.2. The method 2500 may continue at operation 2512 with decoding polling responses from the first ISTAs. For example, RSTA 1704 may decode poll response 1716.1 and poll response 1716.2.

The method 2500 may continue at operation 2508 with selecting second ISTAs from the first ISTAs based on the polling responses. For example, RSTA 1704 may have transmitted the polling TF 1714 to additional ISTAs 1702 and selected ISTA1 1702.1 and ISTA2 1702.2 to transmit location TF 1718 to.

The method 2500 may continue (not illustrated) with configuring the RSTA to transmit the location TF to the second ISTAs. For example, an apparatus of RSTA 1704 may configure the RSTA 1704 to transmit the location TF 1718.

The method 2500 may continue at operation 2510 with generating first LTF sequences of ones and zeros using the sounding sequence number and the temporary key. For example, RST 1704 may generate LTF sequences 1410, which may be generated during or after operation 1760.

The method 2500 may continue at operation 2512 with decoding UL NDPs received from the second ISTAs at times T2, wherein the UL NDPs comprise first LTFs and wherein the first LTFs are decoded using the first LTF sequences. For example, RSTA 1704 may decode ULNDPs 1720 and use LTF sequences 1410 to decode interpret the UL NDP 1720. The RSTA 1704 may authenticate the UL NDPs 1720 using the LTF sequences 1410.

The method 2500 may continue (not illustrated) with encoding a NDPA frame, the NDPA frame comprising DL resource allocations for transmitting DL NDPs to the second ISTAs. For example, the RSTA 1704 may encode NDPA 1724, which may include DL resource allocations, e.g., an resource unit for a frequency allocation and a spatial stream allocation for each of the ISTAs 1702.

The method 2500 may continue (not illustrated) with generating second LTF sequences of ones and zeros using the sounding sequence number and the temporary key. For example, RSTA 1704 may generate LTF sequences 1410 using long token 1228, master key 1402, and temp key 1404. The long token 1228 may have been incremented so that the long token 1228 has a different value for encoding DL NDP 1726 than UL NDP 1720.

The method 2500 may continue (not illustrated) with encoding DL NDPs for transmission to the RSTAs, the DL NDP comprising second LTFs, where the second LTFs are encoded based on the second LTF sequences. For example, RSTA 1704 may encode DL NDPs 1726 using the LTF sequences 1410.

The method 2500 may continue (not illustrated) with configuring the RSTA to transmit the DL NDPs to the second ISTAs at a time T3. For example, an apparatus of the RSTA 1704 may configure the RSTA 1704 to transmit the DL NDPs 1726 at a time T3.

In some embodiments the method 2500 may optionally include encoding LMRs for the second ISTAs, the LMRs comprising channel state information (CSI) reporting or time of arrival (TOA) and time of departure (TOD) reporting for a corresponding ISTA of the second ISTAs, the TOA and TOD reporting indicating a corresponding time T2 and the time T3. For example, RSTA 1704 may encode LMRs 1730 with the times T2 when the UL NDPs 1720 were received by the RSTA 1704 and time T3 when the DL NDPs 1726 were transmitted. The CSI reporting may be channel state information based on received signals of the UL NDP 1720. The ISTA 1702 may determine a round trip time based on times T2 and T3 as well as a time T1 when the UL NDP 1720 was transmitted and a time T4 when the DL NDP 1726 was received.

The method 2500 may optionally continue with generating signaling to transmit each LMR of the LMRs to a corresponding ISTA of the second ISTAs. For example, an apparatus of the RSTA 1704 may configure the RSTA 1704 to transmit the LMR STAs 1730 to corresponding ISTAs 1702.

The time between the operation of method 2500 may be a SIFS. Method 2500 may include one or more additional operation. The operations of method 2500 may be performed in a different order. In some embodiments, one or more operations of method 2500 may be optional.

Figure 26:
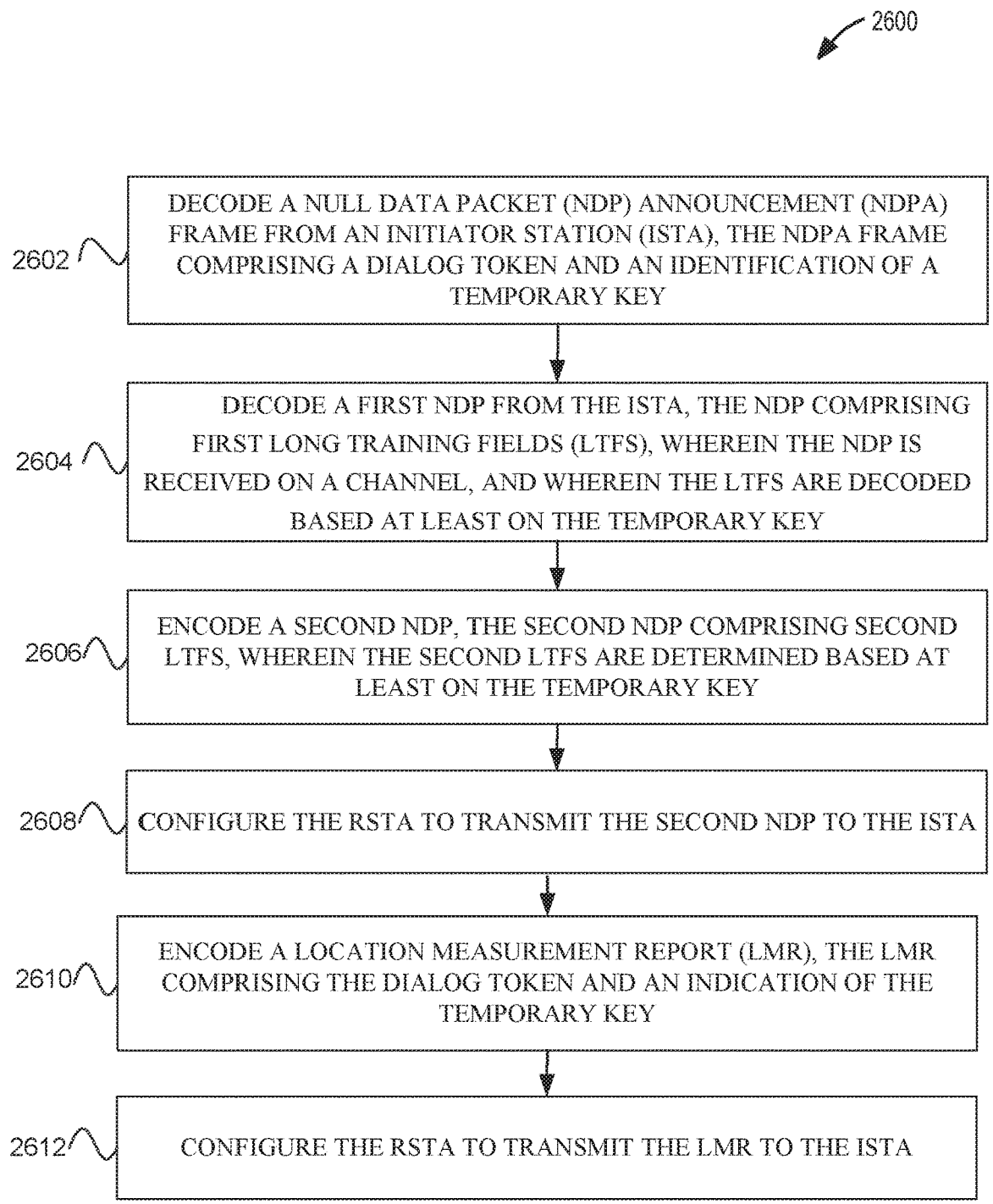
FIG. 26 illustrates a method for authenticating ranging devices, in accordance with some embodiments.

FIG. 26 illustrates a method 2600 for authenticating ranging devices, in accordance with some embodiments. The method 2600 may begin at operation 2602 with decoding a NDPA frame from an ISTA, the NDPA frame comprising a dialog token and an identification of a temporary key. For example, RSTA 1204 may decode NDPA 1228 with dialog token 1229 and a SAC 1226.

The method 2600 may continue at operation 2604 with decoding a first NDP from the ISTA, the NDP comprising first LTFs, where the NDP is received on a channel, and wherein the LTFs are decoded based at least on the temporary key. For example, RSTA 1204 may decide UL NDP 1232 on channel 1218.2.

The method 2600 may continue at operation 2606 with encoding a second NDP, the second NDP comprising second LTFs, where the second LTFs are determined based at least on the temporary key. For example, RSTA 1204 may encode DL NDP 1236 based on a temporary key indicated by the SAC 1226.

The method 2600 may continue at operation 2608 with configuring the RSTA to transmit the second NDP to the ISTA. For example, an apparatus of the RSTA 1204 may configure the RSTA 1204 to transmit the DL NDP 1236.

The method 2600 may continue at operation 2610 with encoding a LMR, the LMR comprising the dialog token and an indication of the temporary key. For example, RSTA 1204 may encode LMR 1242 which may include SAC 1226 and DT 1229. The method 2700 may continue at operation 2612 with configuring the RSTA to transmit the LMR to the ISTA. For example, an apparatus of the RSTA 1204 may configure the RSTA 1204 to transmit the LMR 1242.

Method 2600 may include one or more additional operations. The operations of method 2600 may be performed in a different order. In some embodiments, one or more operations of method 2600 may be optional.

The following examples provide additional example embodiments. Example 1 is an apparatus of a responder station (RSTA), the apparatus including memory; and processing circuitry coupled to the memory, the processing circuitry configured to: decode a null data packet (NDP) announcement (NDPA) frame from an initiator station (ISTA), the NDPA frame including a dialog token and an identification of a temporary key; decode a first NDP from the ISTA, the NDP including first long training fields (LTFs), where the NDP is received on a channel, and where the LTFs are decoded based at least on the temporary key; encode a second NDP, the second NDP including second LTFs, where the second LTFs are determined based at least on the temporary key; configure the RSTA to transmit the second NDP to the ISTA; encode a location measurement report (LMR), the LMR including the dialog token and the indication of the temporary key; and configure the RSTA to transmit the LMR to the ISTA.

In Example 2, the subject matter of Example 1 includes, where the indication of the temporary key is at least 16 bits.
In Example 3, the subject matter of Examples 1-2 includes, where the processing circuitry is further configured to: encode the LMR to further comprise a time of arrival (TOA) and time of departure (TOD) reporting, the TOA and TOD reporting based on a time T2 and a time T3, where the time T2 is when the RSTA received the first NDP and the time T3 is when the RSTA transmitted the second NDP.

In Example 4, the subject matter of Example 3 includes, where the processing circuitry is further configured to: in response to a determination that an error occurred with the NDPA, the first NDP, or the second NDP, encode the LMR to further comprise an indication of the error.

In Example 5, the subject matter of Examples 1-4 includes, where the dialog token and the indication of the temporary key are an identification of the LMR. In Example 6, the subject matter of Examples 1-5 includes, where the processing circuitry is further configured to: determine a new temporary key; determine a new indication of the temporary key; and encode the LMR to further comprise the new temporary key and the new indication of the temporary key.

In Example 7, the subject matter of Examples 1-6 includes, where the NDPA frame includes an downlink (DL) spatial stream (SS) allocation for the RSTA, and where the processing circuitry is further configured to: encode a Physical Layer (PHY) Protocol Data Unit (PPDU) to comprise the second NDP, the second NDP including the second LTFs, where a number of the second LTFs is based on a number of SSs of the DL SS allocation; and generate signaling to cause the RSTA to transmit the PPDU to the ISTA in accordance with orthogonal frequency division multiple access (OFDMA) and multiple-user multiple-input multiple-output (MU-MIMO).

In Example 8, the subject matter of Examples 1-7 includes, where the processing circuitry is further configured to; decode a second NDPA frame from the ISTA, the NDPA frame including a second dialog token, where a value of the second dialog token is one greater than the value of the first dialog token, or the value of the second dialog token is a reset value.

In Example 9, the subject matter of Examples 1-8 includes, where the processing circuitry is further configured to: determine a message integrity check (MIC) for the LMR, where the MIC encrypts a data portion of a physical layer (PHY) protocol data unit (PPDU) that includes the LMR using one or more of the dialog token, the temporary key, and a master key; and encode the LMR to comprise the MIC.

In Example 10, the subject matter of Examples 1-9 includes, where the indication of the temporary key is a sequence authentication code (SAC). In Example 11, the subject matter of Examples 1-10 includes, where the processing circuitry is further configured to: authenticate the first NDP using at least the temporary key; and encode the LMR to comprise an indication of an error if the first NDP is not authenticated.

In Example 12, the subject matter of Examples 1-11 includes, where the processing circuitry is further configured to: encode a second NDP, the second NDP including second LTFs, where the second LTFs are determined based at least on the temporary key, a master key, and the dialog token.

In Example 13, the subject matter of Examples 1-12 includes, where the processing circuitry is further configured to: determine not to respond to the NDPA frame if a previous NDPA frame comprised a same value of the indication of the temporary key and a same value of the temporary key.

In Example 14, the subject matter of Examples 1-13 includes, where the ISTA and the RSTA are configured to operate in accordance with one or more of the following communication standards: an Institute of Electrical and Electronic Engineers (IEEE) 802.11ax, an IEEE 802.11 extremely-high throughput (EHT), IEEE 802.11 az, and IEEE 802.11.

In Example 15, the subject matter of Examples 1-14 includes, transceiver circuitry coupled to the processing circuitry; and one or more antennas coupled to the transceiver circuitry.

Example 16 is a non-transitory computer-readable storage medium that stores instructions for execution by one or more processors of an apparatus of an responder station (RSTA), the instructions to configure the one or more processors to: decode a null data packet (NDP) announcement (NDPA) frame from an initiator station (ISTA), the NDPA frame including a dialog token and an identification of a temporary key; decode a first NDP from the ISTA, the NDP including first long training fields (LTFs), where the NDP is received on a channel, and where the LTFs are decoded based at least on the temporary key; encode a second NDP, the second NDP including second LTFs, where the second LTFs are determined based at least on the temporary key; configure the RSTA to transmit the second NDP to the ISTA; encode a location measurement report (LMR), the LMR including the dialog token and the indication of the temporary key; and configure the RSTA to transmit the LMR to the ISTA.

In Example 17, the subject matter of Example 16 includes, where the instructions further configure the one or more processors to: determine a new temporary key; determine a new indication of the temporary key; and encode the LMR to further comprise the new temporary key and the new indication of the temporary key.

Example 18 is an apparatus of an initiator station (ISTA), the apparatus including memory; and processing circuitry coupled to the memory, the processing circuitry configured to: in response to a determination that a value of a dialog token is a maximum value, reset the value of the dialog token, otherwise increment the value of the dialog token by one; encode a null data packet (NDP) announcement (NDPA) frame, the NDPA frame including the dialog token and an identification of a temporary key; configure the ISTA to transmit the NDPA to a responder STA (RSTA); encode a first NDP, the NDP including first long training fields (LTFs) where the first LTFs are determined based at least on the temporary key; configure the ISTA to transmit the first NDP on a channel to the RSTA; decode a second NDP, the second NDP including second LTFs; and decode a location measurement report (LMR), the LMR including the dialog token and the indication of the temporary key.

In Example 19, the subject matter of Example 18 includes, where the indication of the temporary key is at least 16 bits. In Example 20, the subject matter of Examples 18-19 includes, is when the RSTA transmitted the second NDP, and where the processing circuitry is further configured to: determine a distance between the RSTA and ISTA based on the time T2 and the time T3.

Example 21 is a method performed on a responder station (RSTA), the method including: decoding a null data packet (NDP) announcement (NDPA) frame from an initiator station (ISTA), the NDPA frame including a dialog token and an identification of a temporary key; decoding a first NDP from the ISTA, the NDP including first long training fields (LTFs), where the NDP is received on a channel, and where the LTFs are decoded based at least on the temporary key; encoding a second NDP, the second NDP including second LTFs, where the second LTFs are determined based at least on the temporary key; configuring the RSTA to transmit the second NDP to the ISTA; encoding a location measurement report (LMR), the LMR including the dialog token and the indication of the temporary key; and configuring the RSTA to transmit the LMR to the ISTA.

In Example 22, the subject matter of Example 21 includes, where the indication of the temporary key is at least 16 bits. In Example 23, the subject matter of Examples 21-22 includes, where the method further includes: encoding the LMR to further comprise a time of arrival (TOA) and time of departure (TOD) reporting, the TOA and TOD reporting based on a time T2 and a time T3, where the time T2 is when the RSTA received the first NDP and the time T3 is when the RSTA transmitted the second NDP.

In Example 24, the subject matter of Example 23 includes, where the method further includes: in response to a determination that an error occurred with the NDPA, the first NDP, or the second NDP, encoding the LMR to further comprise an indication of the error.

In Example 25, the subject matter of Examples 21-24 includes, where the dialog token and the indication of the temporary key are an identification of the LMR. In Example 26, the subject matter of Examples 21-25 includes, where the method further includes: determining a new temporary key; determining a new indication of the temporary key; and encoding the LMR to further comprise the new temporary key and the new indication of the temporary key.

In Example 27, the subject matter of Examples 21-26 includes, where the NDPA frame includes an downlink (DL) spatial stream (SS) allocation for the RSTA, and where the method further includes: encoding a Physical Layer (PHY) Protocol Data Unit (PPDU) to comprise the second NDP, the second NDP including the second LTFs, where a number of the second LTFs is based on a number of SSs of the DL SS allocation; and generating signaling to cause the RSTA to transmit the PPDU to the ISTA in accordance with orthogonal frequency division multiple access (OFDMA) and multiple-user multiple-input multiple-output (MU-MIMO).

In Example 28, the subject matter of Examples 21-27 includes, where the method further includes: decoding a second NDPA frame from the ISTA, the NDPA frame including a second dialog token, where a value of the second dialog token is one greater than the value of the first dialog token, or the value of the second dialog token is a reset value.

In Example 29, the subject matter of Examples 21-28 includes, where the method further includes: determining a message integrity check (MIC) for the LMR, where the MIC encrypts a data portion of a physical layer (PHY) protocol data unit (PPDU) that includes the LMR using one or more of the dialog token, the temporary key, and a master key; and encoding the LMR to comprise the MIC.

In Example 30, the subject matter of Examples 21-29 includes, where the indication of the temporary key is a sequence authentication code (SAC).

In Example 31, the subject matter of Examples 21-30 includes, where the method further includes: authenticating the first NDP using at least the temporary key; and encoding the LMR to comprise an indication of an error if the first NDP is not authenticated.

In Example 32, the subject matter of Examples 21-31 includes, where the method further includes: encoding a second NDP, the second NDP including second LTFs, where the second LTFs are determined based at least on the temporary key, a master key, and the dialog token.

In Example 33, the subject matter of Examples 21-32 includes, where the method further includes: determining not to respond to the NDPA frame if a previous NDPA frame comprised a same value of the indication of the temporary key and a same value of the temporary key.

In Example 34, the subject matter of Examples 21-33 includes, where the ISTA and the RSTA are configured to operate in accordance with one or more of the following communication standards: an Institute of Electrical and Electronic Engineers (IEEE) 802.11ax, an IEEE 802.11 extremely-high throughput (EHT), IEEE 802.11 az, and IEEE 802.11.

Example 35 is a apparatus on a responder station (RSTA), the apparatus including: means for decoding a null data packet (NDP) announcement (NDPA) frame from an initiator station (ISTA), the NDPA frame including a dialog token and an identification of a temporary key; means for decoding a first NDP from the ISTA, the NDP including first long training fields (LTFs), where the NDP is received on a channel, and where the LTFs are decoded based at least on the temporary key; means for encoding a second NDP, the second NDP including second LTFs, where the second LTFs are determined based at least on the temporary key; means for configuring the RSTA to transmit the second NDP to the ISTA; means for encoding a location measurement report (LMR), the LMR including the dialog token and the indication of the temporary key; and means for configuring the RSTA to transmit the LMR to the ISTA.

In Example 36, the subject matter of Example 35 includes, where the indication of the temporary key is at least 16 bits.

In Example 37, the subject matter of Examples 35-36 includes, where the apparatus further includes: means for encoding the LMR to further comprise a time of arrival (TOA) and time of departure (TOD) reporting, the TOA and TOD reporting based on a time T2 and a time T3, where the time T2 is when the RSTA received the first NDP and the time T3 is when the RSTA transmitted the second NDP.

Example 38 is a non-transitory computer-readable storage medium that stores instructions for execution by one or more processors of an apparatus of an initiator station (ISTA), the instructions to configure the one or more processors to: in response to a determination that a value of a dialog token is a maximum value, reset the value of the dialog token, otherwise increment the value of the dialog token by one; encode a null data packet (NDP) announcement (NDPA) frame, the NDPA frame including the dialog token and an identification of a temporary key, configure the ISTA to transmit the NDPA to a responder STA (RSTA); encode a first NDP, the NDP including first long training fields (LTFs) where the first LTFs are determined based at least on the temporary key; configure the ISTA to transmit the first NDP on a channel to the RSTA; decode a second NDP, the second NDP including second LTFs; and decode a location measurement report (LMR), the LMR including the dialog token and the indication of the temporary key.

In Example 39, the subject matter of Example 38 includes, where the indication of the temporary key is at least 16 bits. In Example 40, the subject matter of Examples 38-39 includes, is when the RSTA transmitted the second NDP, and where the instructions further configure the one or more processors to: determine a distance between the RSTA and ISTA based on the time T2 and the time T3.

Example 41 is a method performed on an initiator station (ISTA), the method including: in response to a determination that a value of a dialog token is a maximum value, resetting the value of the dialog token, otherwise incrementing the value of the dialog token by one; encoding a null data packet (NDP) announcement (NDPA) frame, the NDPA frame including the dialog token and an identification of a temporary key; configuring the ISTA to transmit the NDPA to a responder STA (RSTA); encoding a first NDP, the NDP including first long training fields (LTFs) where the first LTFs are determined based at least on the temporary key; configuring the ISTA to transmit the first NDP on a channel to the RSTA; decoding a second NDP, the second NDP including second LTFs; and decoding a location measurement report (LMR), the LMR including the dialog token and the indication of the temporary key.

In Example, 42, the subject matter of Example, 41 includes, where the indication of the temporary key is at least 16 bits. In Example 43, the subject matter of Examples 40-42 includes, is when the RSTA transmitted the second NDP, and where the method further includes: determining a distance between the RSTA and ISTA based on the time T2 and the time T3.

Example 44 is apparatus of an initiator station (ISTA), the apparatus including: means for performing in response to a determination that a value of a dialog token is a maximum value, resetting the value of the dialog token, otherwise incrementing the value of the dialog token by one; means for encoding a null data packet (NDP) announcement (NDPA) frame, the NDPA frame including the dialog token and an identification of a temporary key; means for configuring the ISTA to transmit the NDPA to a responder STA (RSTA); means for encoding a first NDP, the NDP including first long training fields (LTFs) where the first LTFs are determined based at least on the temporary key; means for configuring the ISTA to transmit the first NDP on a channel to the RSTA; means for decoding a second NDP, the second NDP including second LTFs; and means for decoding a location measurement report (LMR), the LMR including the dialog token and the indication of the temporary key.

In Example 45, the subject matter of Example 44 includes, where the indication of the temporary key is at least 16 bits. In Example 46, the subject matter of Examples 44-45 includes, is when the RSTA transmitted the second NDP, and where the apparatus further includes: means for determining a distance between the RSTA and ISTA based on the time T2 and the time T3.

Example 47 is at least one machine-readable medium including instructions that, when executed by processing circuitry, cause the processing circuitry to perform operations to implement of any of Examples 1-46.

Example 48 is an apparatus including means to implement of any of Examples 1-46. Example 49 is a system to implement of any of Examples 1-46. Example 50 is a method to implement of any of Examples 1-46.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a responding station (RSTA), the apparatus comprising memory; and processing circuitry coupled to the memory, the processing circuitry configured to:
   encode for transmission an initial fine timing measurement (FTM) frame, the initial FTM frame comprising a first secure long-training field (LTF) parameters element, the first secure LTF parameters element comprising a first LTF generation sequence authentication code (SAC) subfield and a first secure LTF counter subfield, wherein the first LTF generation SAC subfield indicates a first new LTF generation SAC and the first secure LTF counter subfield indicates a new secure LTF counter;
   configure the RSTA to transmit the initial FTM frame to an initiating station (ISTA);
   decode a ranging null data packet (NDP) announcement frame received from the ISTA in response to the initial FTM frame, the ranging NDP announcement frame comprising a SAC subfield and a station (STA) information subfield, the STA information subfield identifying the RSTA, wherein a value of the SAC subfield is equal to the first new LTF generation SAC;
   decode a downlink (DL) NDP from the ISTA following the ranging NDP, the DL NDP comprising first secure LTFs, the first secure LTFs being decoded based on the new secure LTF counter;
   encode an uplink (UL) NDP for transmission to the ISTA following the DL NDP, the UL NDP comprising second secure LTFs, the second secure LTFs generated based on the new secure LTF counter; and
   encode for transmission a location measurement report (LMR) frame, the LMR frame comprising a second secure LTF parameters element, the second secure LTF parameters element comprising a second LTF generation SAC subfield indicating a second new LTF generation SAC, a second secure LTF counter subfield indicating a value of the new secure LTF counter plus one, and a ranging measurement SAC subfield, the ranging measurement SAC subfield having a value of the SAC subfield of the ranging NDP announcement frame.

2. The apparatus of claim 1, wherein the processing circuitry is further configured to:
   before the encode for transmission the initial FTM frame, decode an initial FTM request frame from the ISTA, the initial FTM request frame comprising an indication that secure LTFs are required.

3. The apparatus of claim 1, wherein the processing circuitry is further configured to:
   encode the LMR frame to comprise a time of arrival (TOA) of the DL NDP and a time of departure of the UL NDP.

4. The apparatus of claim 1, wherein encode the UL NDP further comprises:
   derive secure LTF bits to encode the second secure LTFs using the new secure LTF counter; and
   encode the second secure LTFs using the secure LTF bits.

5. The apparatus of claim 1, wherein decode the DL NDP further comprises:
   derive secure LTF bits to decode the first secure LTFs using the new secure LTF counter; and
   decode the first secure LTFs using the secure LTF bits.

6. The apparatus of claim 5, wherein derive secure LTF bits to decode the first secure LTFs further comprises:
   derive secure LTF bits to decode the first secure LTFs using the new secure LTF counter and a secure seed.

7. The apparatus of claim 6, wherein the processing circuitry is further configured to:
   derive the secure seed based on a pairwise transient key security association (PTKSA).

8. The apparatus of claim 1, wherein the processing circuitry is further configured to:
   in response to an error detection in decoding the ranging NDP announcement frame, refrain from encoding the UL NDP and encoding the LMR frame.

9. The apparatus of claim 1, wherein the processing circuitry is further configured to:
   in response to an error detection in decoding the ranging NDP announcement frame or the UL NDP, encode the LMR frame to indicate an error occurred.

10. The apparatus of claim 1, wherein the ranging NDP announcement frame is a first ranging NDP announcement frame, the SAC subfield is a first SAC subfield, STA information subfield is a first STA information subfield, the DL NDP is a first DL NDP, and the UL NDP is a first UL NDP, and wherein the processing circuitry is further configured to:

decode a second ranging NDP announcement frame from the ISTA), the second ranging NDP announcement frame comprising a second SAC subfield and a second STA information subfield, the second STA information subfield identifying the RSTA, wherein a value of the SAC subfield is equal to the second new LTF generation SAC;

decode a second DL NDP from the ISTA, the second DL NDP comprising third secure LTFs, the third secure LTFs being decoded based on the second new secure LTF counter;

encode a second UL NDP for transmission to the ISTA, the second UL NDP comprising fourth secure LTFs, the fourth secure LTFs generated based on the new secure LTF counter; and encode for transmission a second LMR frame, the second LMR frame comprising a third secure LTF parameters element, the third secure LTF parameters element comprising a third LTF generation SAC subfield indicating a third new LTF generation SAC, a third secure LTF counter subfield indicating a value of the second new secure LTF counter plus one, and a second ranging measurement SAC subfield, the second ranging measurement SAC subfield having a value of the second SAC subfield of the second ranging NDP announcement frame.

11. The apparatus of claim 1, wherein the ranging NDP announcement frame further comprises a resource allocation for the RSTA to transmit the UL NDP.

12. The apparatus of claim 1, wherein the ISTA and the RSTA are configured to operate in accordance with one or more of the following communication standards: an Institute of Electrical and Electronic Engineers (IEEE) 802.11ax, an IEEE 802.11 extremely-high throughput (EHT), IEEE 802.11az, and IEEE 802.11.

13. The apparatus of claim 1 further comprising: mixer circuitry to downconvert RF signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including the NDP announcement frame.

14. The apparatus of claim 1 further comprising 1 mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the NDP announcement frame.

15. A non-transitory computer-readable storage medium that stores instructions for execution by one or more processors of an apparatus of a responder station (RSTA), the instructions to configure the one or more processors to:

encode for transmission an initial fine timing measurement (FTM) frame, the initial FTM frame comprising a first secure long-training field (LTF) parameters element, the first secure LTF parameters element comprising a first LTF generation sequence authentication code (SAC) subfield and a first secure LTF counter subfield, wherein the first LTF generation SAC subfield indicates a first new LTF generation SAC and the first secure LTF counter subfield indicates a new secure LTF counter;

configure the RSTA to transmit the initial FTM frame to an initiating station (ISTA);

decode a ranging null data packet (NDP) announcement frame received from the ISTA in response to the initial FTM frame, the ranging NDP announcement frame comprising a SAC subfield and a station (STA) information subfield, the STA information subfield identifying the RSTA, wherein a value of the SAC subfield is equal to the first new LTF generation SAC;

decode a downlink (DL) NDP from the ISTA following the ranging NDP, the DL NDP comprising first secure LTFs, the first secure LTFs being decoded based on the new secure LTF counter;

encode an uplink (UL) NDP for transmission to the ISTA following the DL NDP, the UL NDP comprising second secure LTFs, the second secure LTFs generated based on the new secure LTF counter; and encode for transmission a location measurement report (LMR) frame, the LMR frame comprising a second secure LTF parameters element, the second secure LTF parameters element comprising a second LTF generation SAC subfield indicating a second new LTF generation SAC, a second secure LTF counter subfield indicating a value of the new secure LTF counter plus one, and a ranging measurement SAC subfield, the ranging measurement SAC subfield having a value of the SAC subfield of the ranging NDP announcement frame.

16. The non-transitory computer-readable storage medium of claim 15, wherein the instructions further configure the one or more processors to:

before the encode for transmission the initial FTM measurement frame, decode an initial FTM request frame from the ISTA, the initial FTM request frame comprising an indication that secure LTFs are required.

17. An apparatus of an initiating station (ISTA), the apparatus comprising memory; and processing circuitry coupled to the memory, the processing circuitry configured to:

encode an initial FTM request frame for a responder station (ISTA), the initial FTM request frame comprising an indication that secure LTFs are required;

encode for transmission an initial fine timing measurement (FTM) frame, the initial FTM frame comprising a first secure long-training field (LTF) parameters element, the first secure LTF parameters element comprising a first LTF generation sequence authentication code (SAC) subfield and a first secure LTF counter subfield, wherein the first LTF generation SAC subfield indicates a first new LTF generation SAC and the first secure LTF counter subfield indicates a new secure LTF counter;

configure the RSTA to transmit the initial FTM frame to the ISTA;

decode a ranging null data packet (NDP) announcement frame from the ISTA, the ranging NDP announcement frame comprising a SAC subfield and a station (STA) information subfield, the STA information subfield identifying the RSTA, wherein a value of the SAC subfield is equal to the first new LTF generation SAC;

decode a downlink (DL) NDP from the ISTA, the DL NDP comprising first secure LTFs, the first secure LTFs being decoded based on the new secure LTF counter, encode an uplink (UL) NDP for transmission to the ISTA, the UL NDP comprising second secure LTFs, the second secure LTFs generated based on the new secure LTF counter; and encode for transmission a location measurement report (LMR) frame, the LMR frame comprising a second secure LTF parameters element, the second secure LTF parameters element comprising a second LTF generation SAC subfield indicating a second new LTF generation SAC, a second secure LTF counter subfield indicating a value of the new secure LTF counter plus one, and a ranging measurement SAC subfield, the ranging measurement SAC subfield having a value of the SAC subfield of the ranging NDP announcement frame.

18. The apparatus of claim 17, wherein encode the UL NDP further comprises:

derive secure LTF bits to encode the second secure LTFs using the new secure LTF counter; and encode the second secure LTFs using the secure LTF bits.

19. The apparatus of claim 17, wherein decode the DL NDP further comprises:

derive secure LTF bits to decode the first secure LTFs using the new secure LTF counter; and decode the first secure LTFs using the secure LTF bits.

20. The apparatus of claim 17, further comprising transceiver circuitry coupled to the processing circuitry and one or more antennas coupled to the transceiver circuitry.

\* \* \* \* \*